LOOK-AHEAD BRANCH DETECTION SYSTEM

Filed Jan. 15, 1968 30 Sheets-Sheet 1

INVENTOR
GRAHAM C. DRISCOLL, JR.

BY [signature]

ATTORNEY

TABLE OF CONDITIONS UNDER WHICH THE VARIOUS REGISTERS IN LEVEL 3 OF THE LOOKAHEAD TREE REQUIRE FILING

| | REGISTER B MASK FIELD | REGISTER SB MASK FIELD | REGISTER BB MASK FIELD |
|---|---|---|---|
| SSS, SSB | NOT ALL "1'S" | NOT ALL "1'S" | — |
| SBS, SBB | NOT ALL "1'S" | NOT ALL "0'S" | — |
| BSS, BSB | NOT ALL "0'S" | — | NOT ALL "1'S" |
| BBS, BBB | NOT ALL "0'S" | — | NOT ALL "0'S" |

LOOK AHEAD TREE

LOOK AHEAD TREE

LOOK AHEAD TREE
BRANCH UNSUCCESSFUL

LOOK AHEAD TREE

LOOK AHEAD TREE

LOOK AHEAD TREE 3,551,895
Patented Dec. 29, 1970

3,551,895

LOOK-AHEAD BRANCH DETECTION SYSTEM

Graham C. Driscoll, Jr., Yorktown Heights, N.Y., assignor to International Business Machines Corporation, Armonk, N.Y., a corporation of New York Filed Jan. 15, 1968, Ser. No. 697,677
Int. Cl. G06f 9/18
U.S. Cl. 340—172.5 19 Claims

ABSTRACT OF THE DISCLOSURE

The present invention relates to a look-ahead branch detection system for use with high speed electronic computing systems. The system utilizes a special Advance Branch Instruction which will be located in an instruction sequence a number of positions prior to the actual potential branch point. It specifies the point at which the branch is to be taken if conditions require and also the point to which the branch is to go. The system utilizes a Look-ahead Tree in which instructions are stored prior to transfer to the actual processor on request. Each time a branch point is detected in the system, a decision is made, if possible, as to whether or not the branching conditions have been met. If it is possible to make this decision, only the proper instruction specified thereby is fetched; otherwise the instructions along both the branch and sequential path are accessed and stored at appropriate locations in the Look-ahead Tree. Included in the system is a Branch Associative Memory which is utilized to test the address of each instruction fetched to see whether or or not it is an instruction immediately following which a branch may be taken.

This system is intended to enhance instruction fetching in high speed electronic computing systems wherein instruction fetching comprises a significant portion of the overall computational cycle and it is desired that a minimum hold up of the processor be allowed for purposes of such instruction fetching. At the same time the system contains condition checking controls whereby instruction accessing in the memory is kept to a minimum.

BACKGROUND OF THE INVENTION

A number of years ago, computers, such as the IBM 704, were generally designed to fetch instructions only after completing the execution of prior instructions. Therefore, when a branch instruction was recognized, the decision as to whether to branch was made, in the case of conditional branches, before a request was sent to storage for the next instruction.

In recent years such high performance machines as STRETCH, the IBM System 360/Model 90 series, as well as a number of other very high speed and sophisticated computers having greatly decreased execution times, have made the storage access time a substantial fraction of the total instruction cycle, while at the same time core storage has grown to a large collection of modules allowing concurrent accesses. These changes have made it desirable to overlap three basic system activities: instruction fetches, data fetches for instructions already received, and execution of instructions for which data have already been received as well as the storage back in memory of the results of current instruction executions. With such a "look-ahead" scheme, however, branches constitute a problem. The problem arises, of course, when the machine does not know in which direction to look, i.e., whether or not the branch is to be taken or which way is "ahead." Any action the system takes may lead to delay, wasted work or both.

There are two aspects to the problem. These are recognition of the branch and making a decision as to whether or not to take same. The decision aspect of the problem concerns the action to be taken after a conditional branch instruction has been recognized but before it has been determined whether the condition is met. There are three apparent strategies to follow in this situation, each having its own advantages and drawbacks. The first is to cease fetching instructions, i.e., to wait until it is decided whether or not the condition has been met. The second is to make an assumption as to whether the branch will be taken and to fetch instructions along the assumed path. The third is to fetch instructions along both paths. The first strategy slows down the machine, throwing away the advantage of look-ahead under such circumstances. The second strategy may do likewise if the wrong assumption is made and in addition creates unnecessary memory fetches of instructions when the assumption as to whether or not the branch was to be taken is incorrect. The third strategy requires considerable additional hardware and will always cause unnecessary fetches. Superfluous fetches are undesirable because they may cause memory interference with necessary accesses, and thus slow them down.

The recognition aspect of the problem, as encountered in prior art systems, concerns the unknowing passage of the instruction fetch mechanism past a branching point. When the fetch of a branch instruction, conditional or unconditional, is initiated, the machine cannot recognize that a branch instruction is being fetched. Consequently, it will continue to order the fetching of the instructions in normal, or non-branching, sequence until the branch instruction actually arrives from memory and is at least partially decoded. Thus, superfluous fetches may be ordered, and necessary fetches may not be initiated as soon as they would have been had the branch point been recognized as soon as it was reached.

It may thus be seen that there is a definite need for improved "look-ahead" mechanisms for use in current electronic computer systems and more particularly in those of the highly sophisticated variety having extremely high speed execution capabilities and large segmented memories.

SUMMARY AND OBJECTS

It has now been found that the recognition aspect of the look-ahead problem outlined above may be largely alleviated by utilizing a special "Advance Branch" instruction which is placed in the instruction list at some point a minimum distance from the actual point at which the branch is to occur and the provision of hardware capable of recognizing this special instruction and utilizing the information contained therein so that as soon as the branch point is reached by the instruction fetch mechanism, appropriate decisions as to whether or not the branch will be taken can be made as soon as possible. An additional aspect of the present system partially circumvents or reduces the problems attendant with the decision aspect of the look-ahead problem. Specifically, it provides means for making the branch decision at one of a number of possible points.

It is anticipated that the condition statement be divorced from the branch instruction at least insofar as setting up the condition test, etc. In this way the condition statement can be literally inserted almost at will in the instruction stream assuming of course it will always have to precede the actual branch point unless an absolute branch is being taken, which allows considerable flexibility in the system. However, with the Advance Branch instruction a mask will be specified which sets in motion a mechanism for testing whether conditions have been met. In the following embodiment, the mechanism is set in motion either when the Advance Branch instruction is executed or when the branch point is reached, but anyone skilled in the art could provide for the mechanisms being set in motion at any intermediate point specified by the programmer, by providing an additional field in the Advance Branch instruction. Thus, if the condition can be specified sufficiently far in advance, it may be possible to predict, in effect, an absolute branch so that the fetching of non-branch instructions after the branch point may be avoided where this decision is possible. However, the system is sufficiently general that this need not be the case.

It is accordingly a primary object of the present invention to provide an improved computer look-ahead branch detection system.

It is a further object of the invention to provide such a computer look-ahead system utilizing a novel type of instruction and special hardware for utilizing same.

It is yet another object of the invention to provide such a system which will avoid wasted instruction access cycles due to decoding delays of conventional branch instructions.

It is a further object of the invention to provide such a system wherein a branch point is specified to the system at a point significantly advanced in time from said branch point that the system will always detect the branch point as it is encountered.

It is yet another object of the invention to provide such a look-ahead system having maximum flexibility in making branch decisions.

It is yet another feature of the present invention to provide such a look-ahead system wherein the condition statement may be separated from the branch address, and wherein specification of a potential branch point, performance of a test whereon branching is to depend, determination of whether the branch is actually to be taken, and the taking of the branch itself may all occur at separate times.

It is a still further object of the invention to provide such a look-ahead system wherein a branch may be entered once and then discarded or may be cycled indefinitely until a conditional statement is satisfied.

The foregoing and other objects, features and advantages of the invention will be apparent from the following more particular description of a preferred embodiment of the invention, as illustrated in the accompanying drawings.

DESCRIPTION OF THE DISCLOSED EMBODIMENT

The objects of the present invention are accomplished in general by a computer look-ahead branch detection system including means for recognizing and storing a special instruction indicating that at a future point in the instruction stream, a branch may occur. Said instruction includes a specific indication of the point in the instruction stream where the branch is to occur and also the point to which the branch may transfer. Means are included for storing said indications and as each new instruction is sent for, its address is compared against said indications to determine if said instruction is a branch point. Additional means are included for determining if a branch condition is met. Said system includes a Look-ahead Tree having a branch and a non-branch section into which instructions are loaded from memory, the specific storage locations in the said tree being relatable to their being in a branch or non-branch instruction sequence.

The system is thus able to detect branch points in an instruction list as soon as "Advance Branch" instructions are encountered and make appropriate decisions as soon as possible based on the conditions associated therewith so that only those instructions relative to said branch point which are absolutely necessary will be extracted from memory.

General philosophy of operation

In the present embodiment it is assumed that the processor proper, as distinct from the look-ahead unit, has only one instruction in execution at a time. Anyone skilled in the art can make any (minor) modifications necessary to allow for a pipelined processor in which several instructions are simultaneously in execution.

Figure 8A:
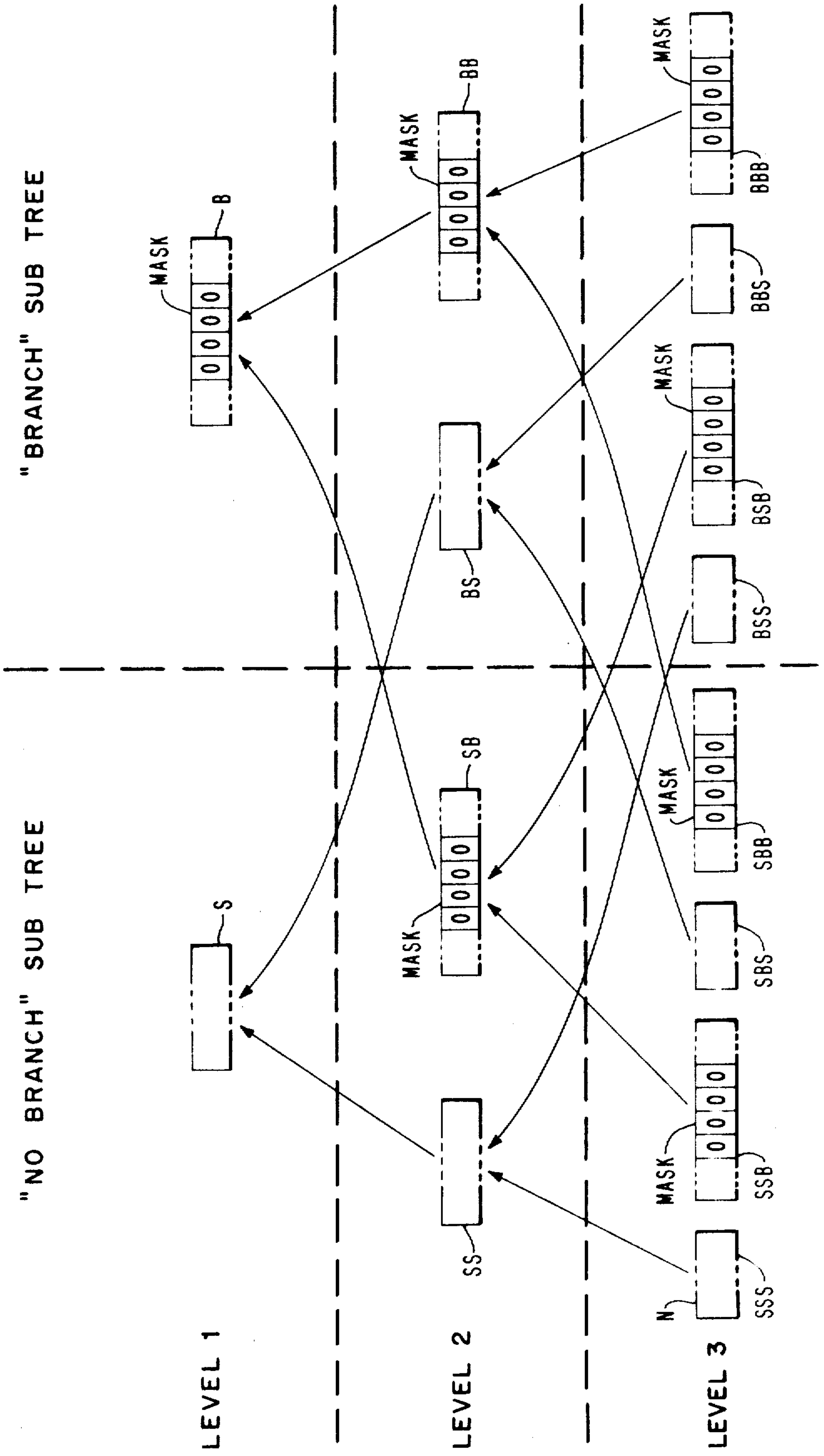
FIG. 8A is a diagrammatic illustration of the 14 registers in the Look-ahead Tree wherein the flow path of instructions within the tree is shown.

The possible instructions which may be executed after the instruction currently being executed form a tree, the Look-ahead Tree, as shown in FIG. 8A. The next instruction may be either the next in sequence (by address at which it is stored) or, if a branch is to be taken, the instruction at the branch address. The Look-ahead Tree has registers to store these two instructions; these registers are denoted "S" (sequential) and "B" (branch), respectively. (The logical format of the Look-ahead Tree registers is described below.) For each of these two instructions there are two possible successor instructions, and so on. For this implementation three levels of look-ahead have been disclosed, and therefore the tree has 14 registers. The number of levels does not make any difference in principal. Note that, for example, the instruction to which Register SBB is currently dedicated will be reached if, after the current instruction is executed, the next one in sequence is taken, and then a branch is taken and then another branch.

Figure 2:
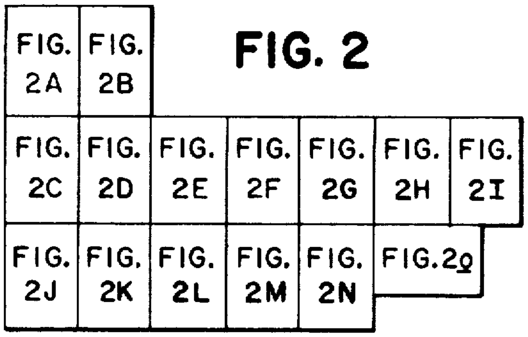
FIG. 2 comprises an organizational diagram for FIGS. 2A–2O.
Figure 2A:
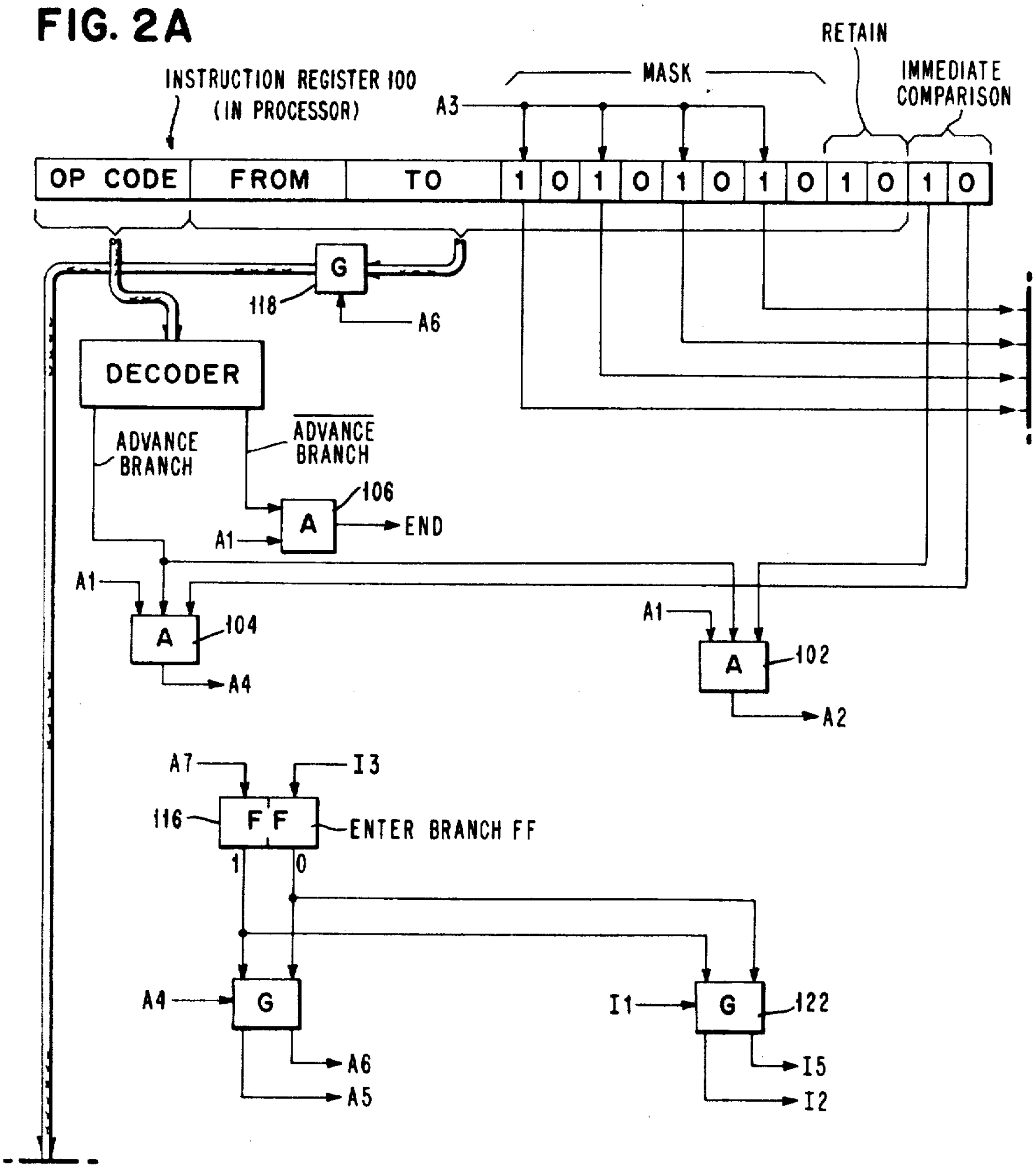
FIGS. 2A–2O comprise a composite logical schematic diagram showing the organization and operation of the essential functional elements of the present system.

In the present embodiment it is assumed that there is only one type of "Advance Branch" instruction, the one shown in the Instruction Register of FIG. 2A. The "From" field contains the address of the instruction after which the branch is perhaps to be made, and the "To" field the address of the instruction to be executed if the branch is successful (i.e., it corresponds to the "Branch Address" of an ordinary branch instruction). The "Mask" has the same function as in an IBM System 360 Branch on Condition instruction: the branch is to be taken if the Condition Code contains a "1" in any of the positions where the "Mask" has a "1," and the branch is not to be taken otherwise. As implied, for the present embodiment it is assumed that the processor has a Condition Code, as in System 360. The "Retain" bit indicates, essentially, whether this branch is to be considered only the very next time the instruction at the "From" address is executed, or each time it is executed. The "Immediate Comparison" bit indicates whether the comparison of "Mask" and Condition Code (and thus the decision whether to branch)

is to be made immediately during the execution of the "Advance Branch" instruction, or deferred until the end of the execution of the instruction at the "From" address. Making the decision earlier would generally be preferable, since it eliminates some unnecessary instruction fetches, but this may, of course, not always be possible.

A person skilled in the art could make the necessary modifications in the disclosed embodiment to incorporate any or all of the following:

Branching conditional on criteria other than the Condition Code, such as index, for example;

"From" and "To" addresses given relative to the address of the "Advance Branch" instruction, rather than as absolute values;

"To" addresses given relative to "From" addresses;

Indexing of the "From" and "To" addresses, together with means for indicating at what point in the program execution the index register contents are to be considered valid for this purpose;

Consideration of the branch not just either once or forever, but for some given number of times, i.e., replacement of the "Retain" bit by a count field;

Permitting the comparison of the "Mask" and the Condition Code to be made at any specified time between the execution of the "Advance Branch" instruction and the execution of the instruction at the "From" address.

Figure 2B:
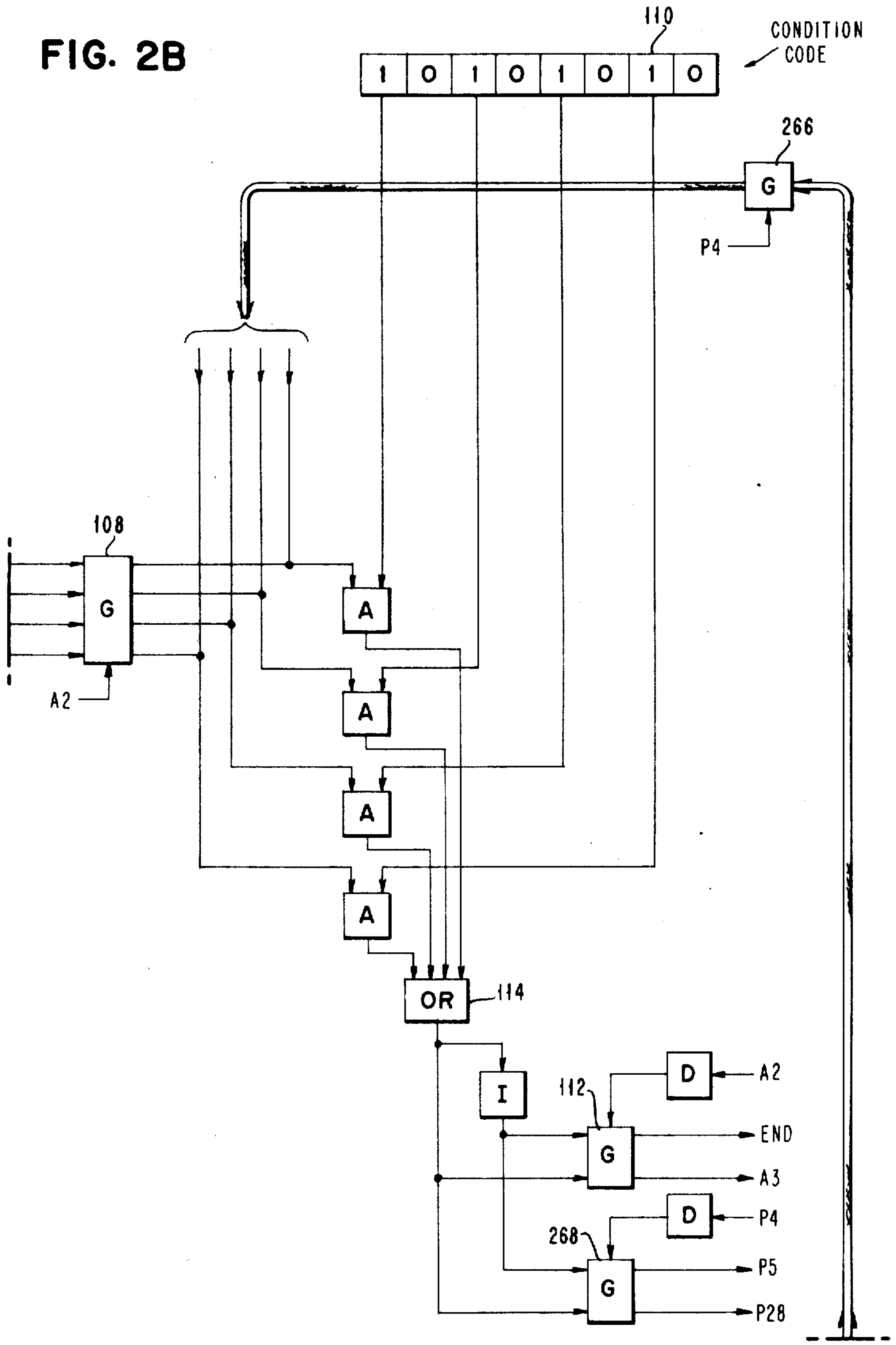
Figure 2C:
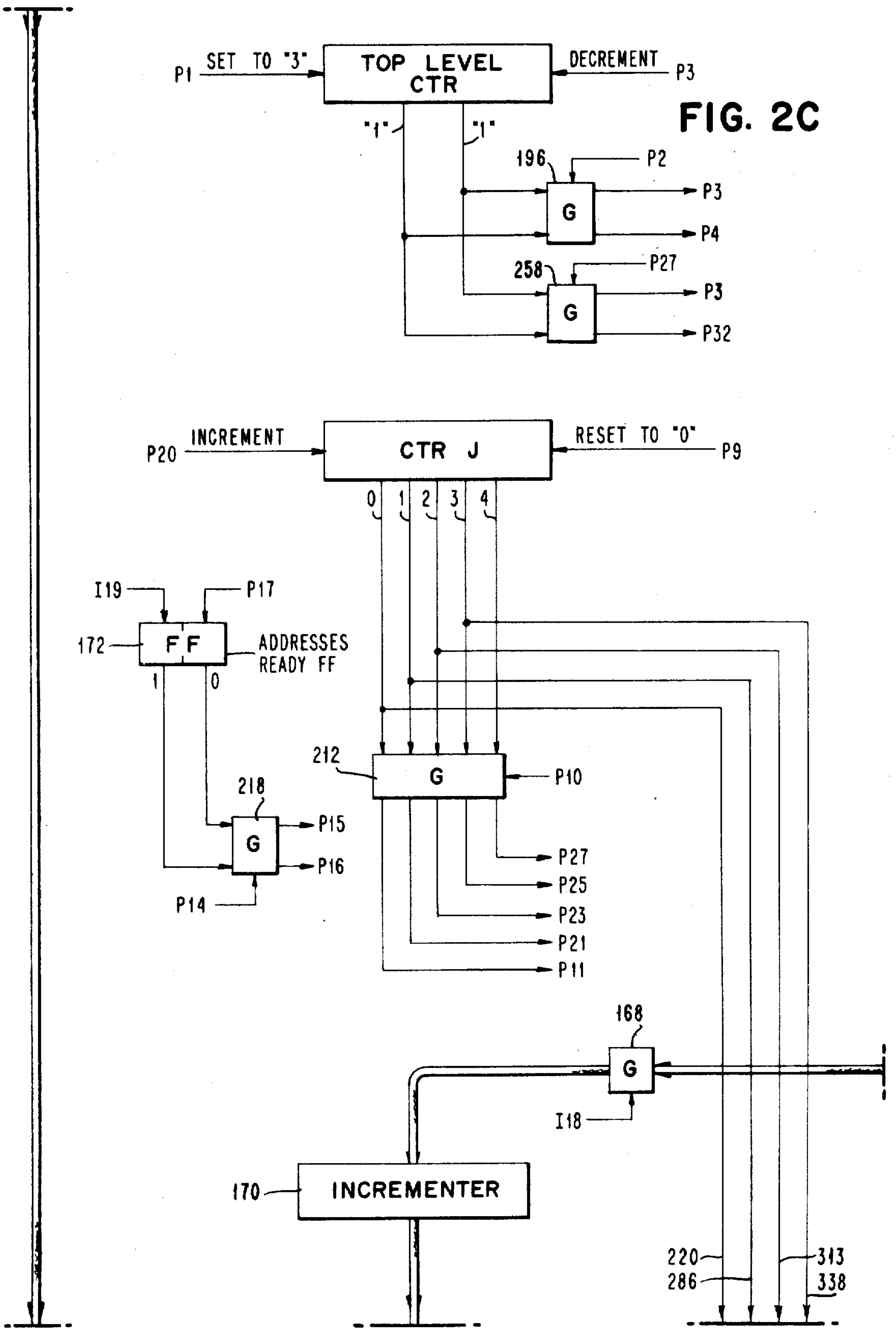
Figure 2D:
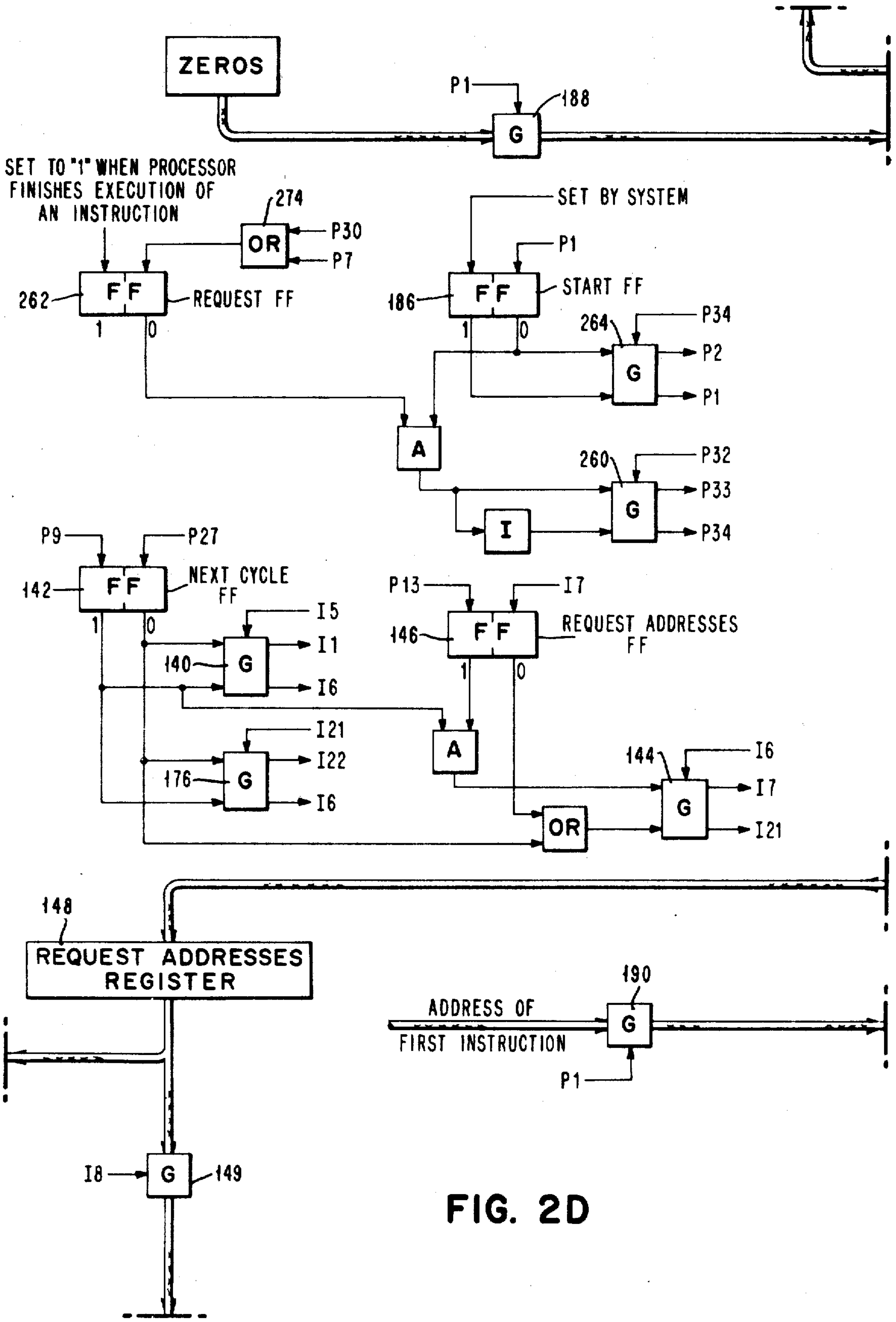
Figure 2E:
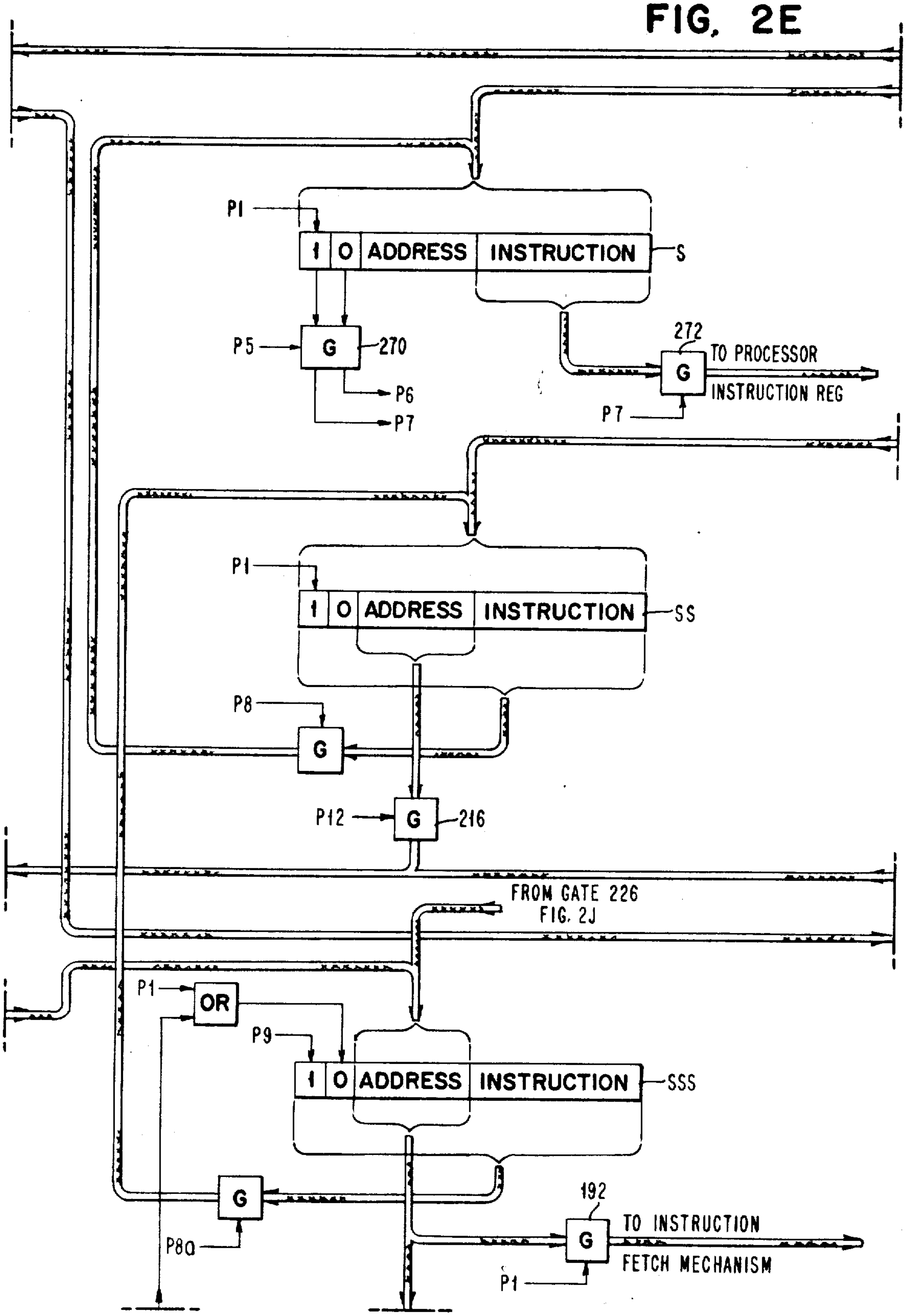
Figure 2F:
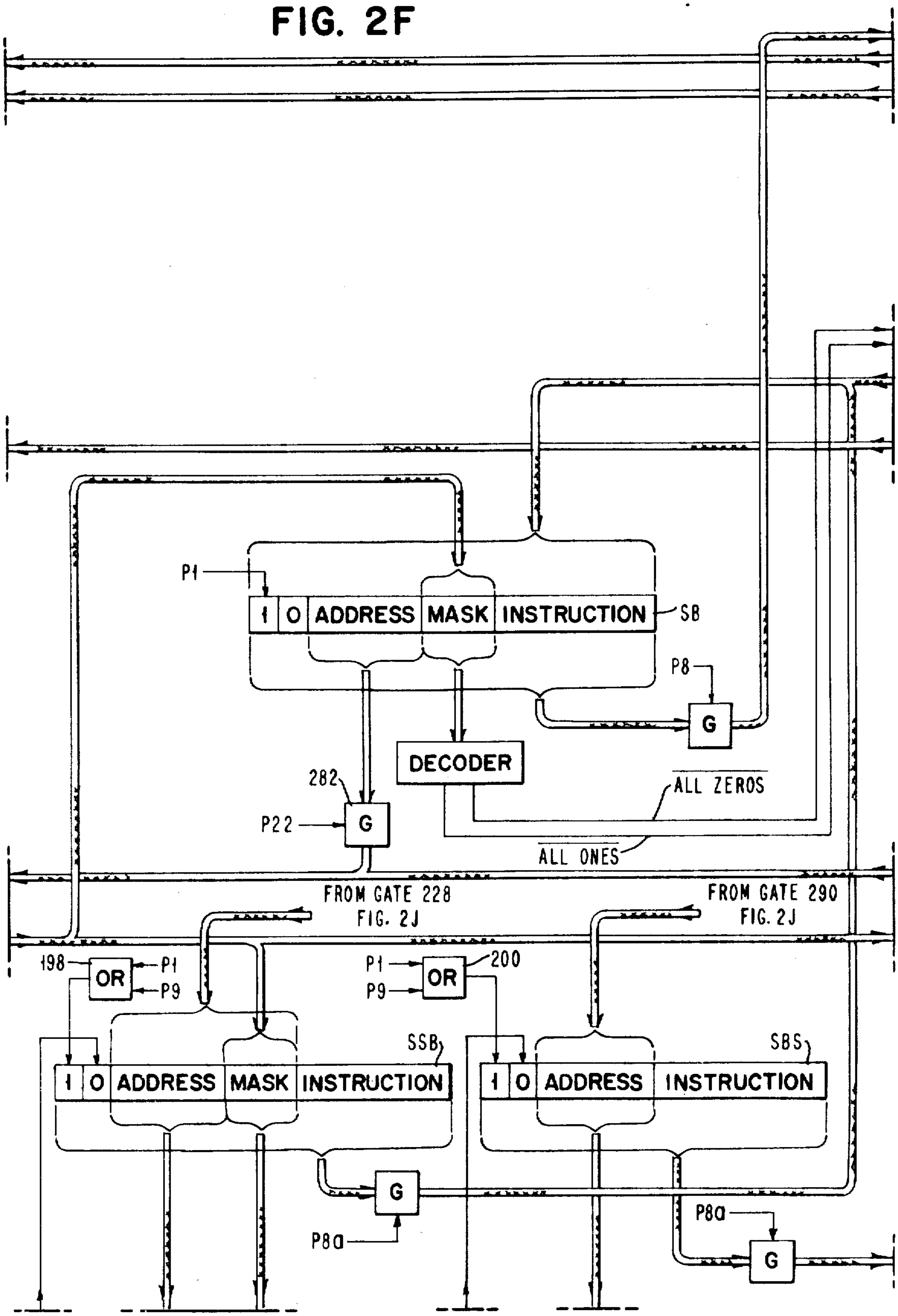
Figure 2G:
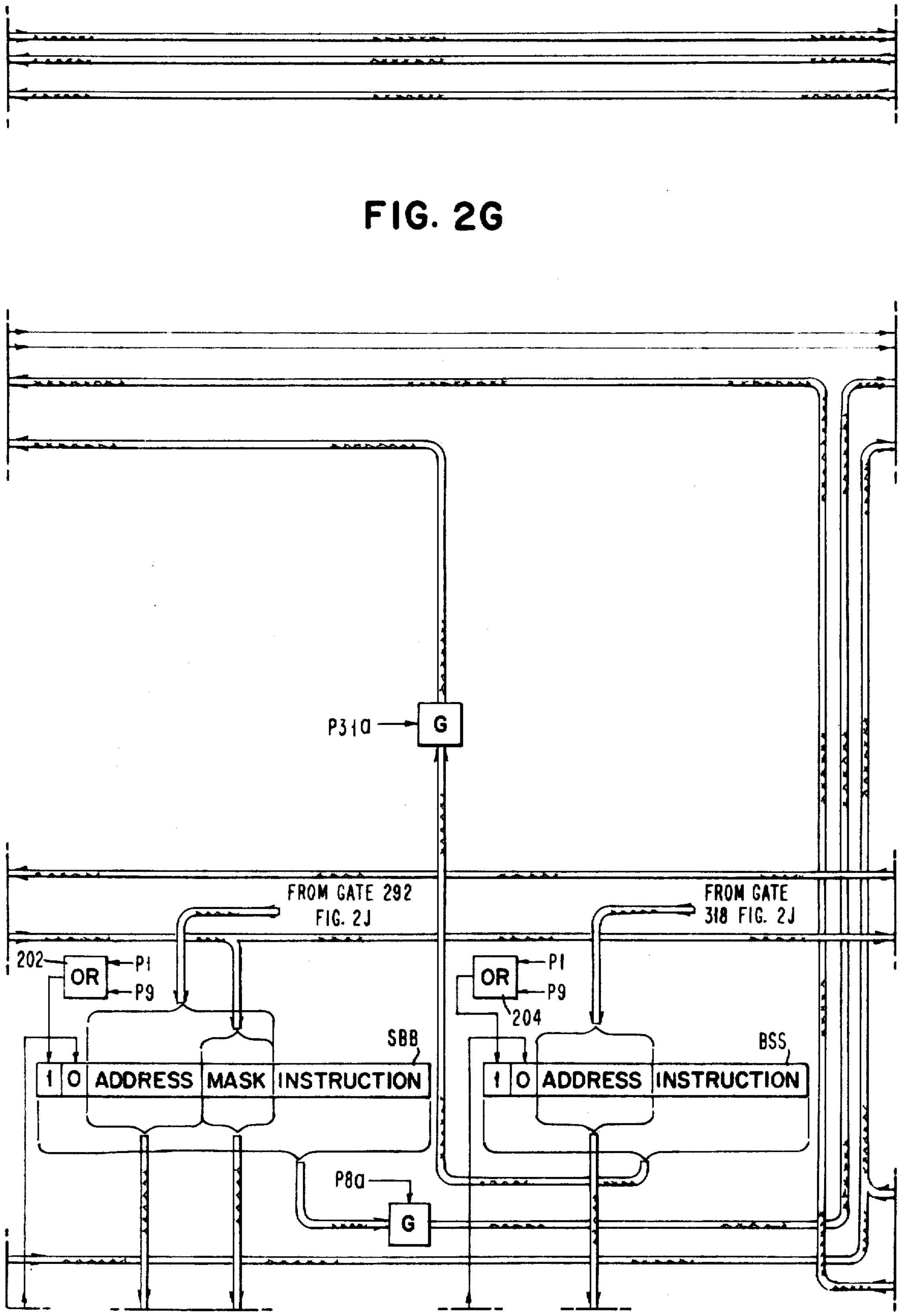
Figure 2H:
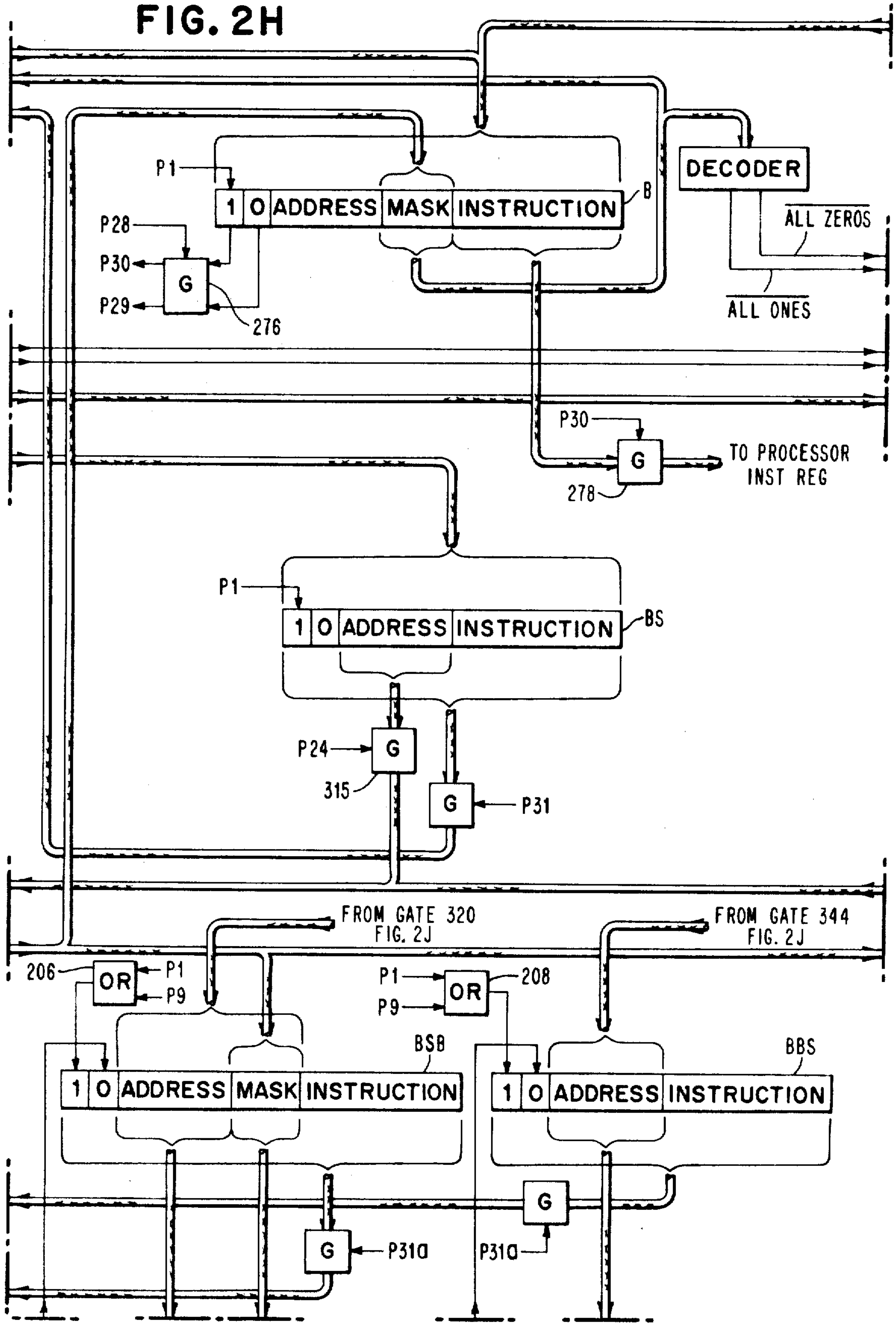
Figure 2I:
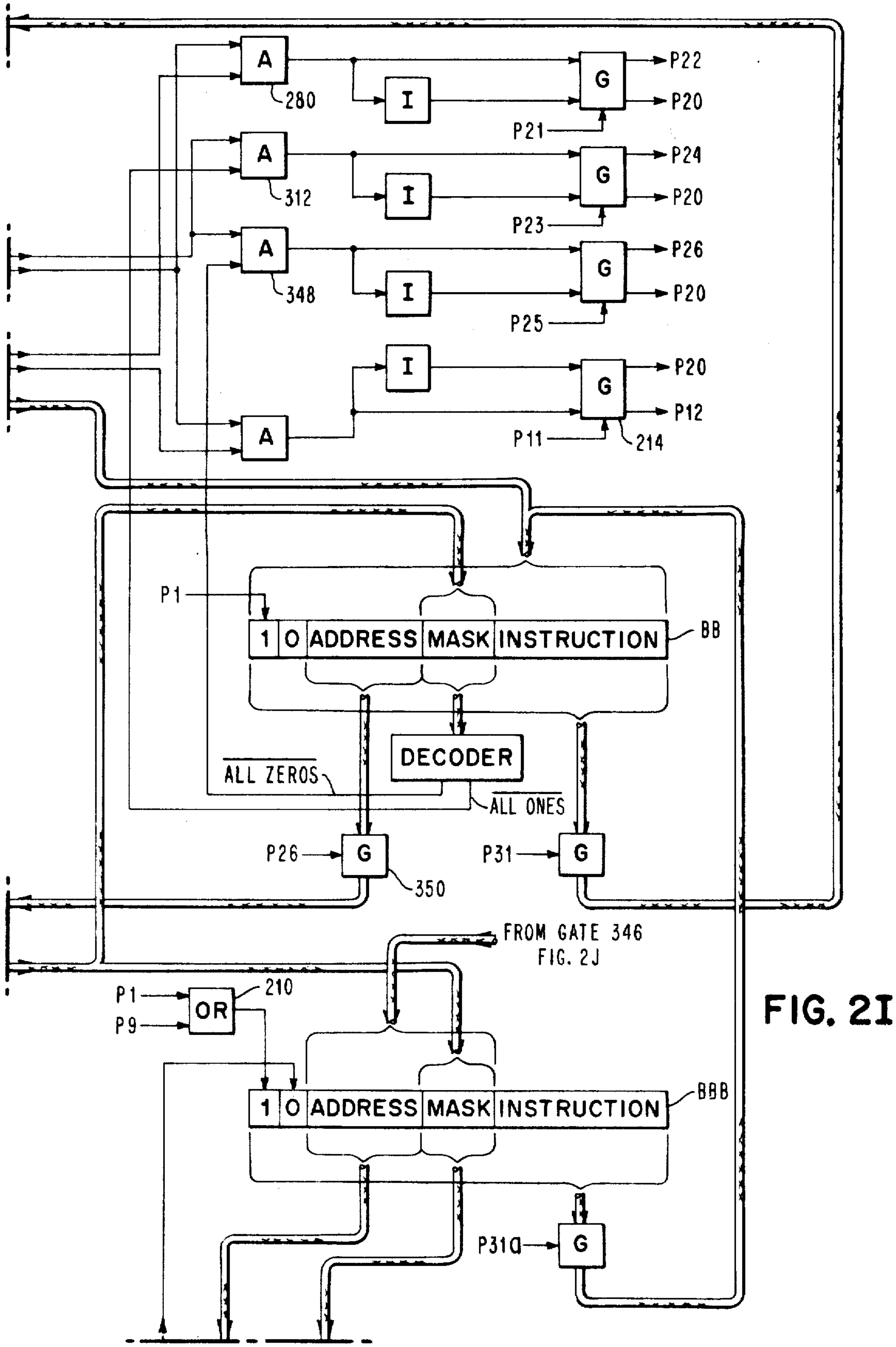

The look-ahead registers (14) shown in FIGS. 2E, F, G, H and I have three principal fields, as indicated in the figure. The "Address" field is used to identify the register in which an instruction received from storage is to be placed as well as the address of the instruction. It is also used to determine the possible successor instructions. The "Mask" field contains the mask from the "Advance Branch" instruction and is used to determine whether a branch is to be taken or not. The "instruction" field holds the instruction itself, after it is received from storage.

Figure 2J:
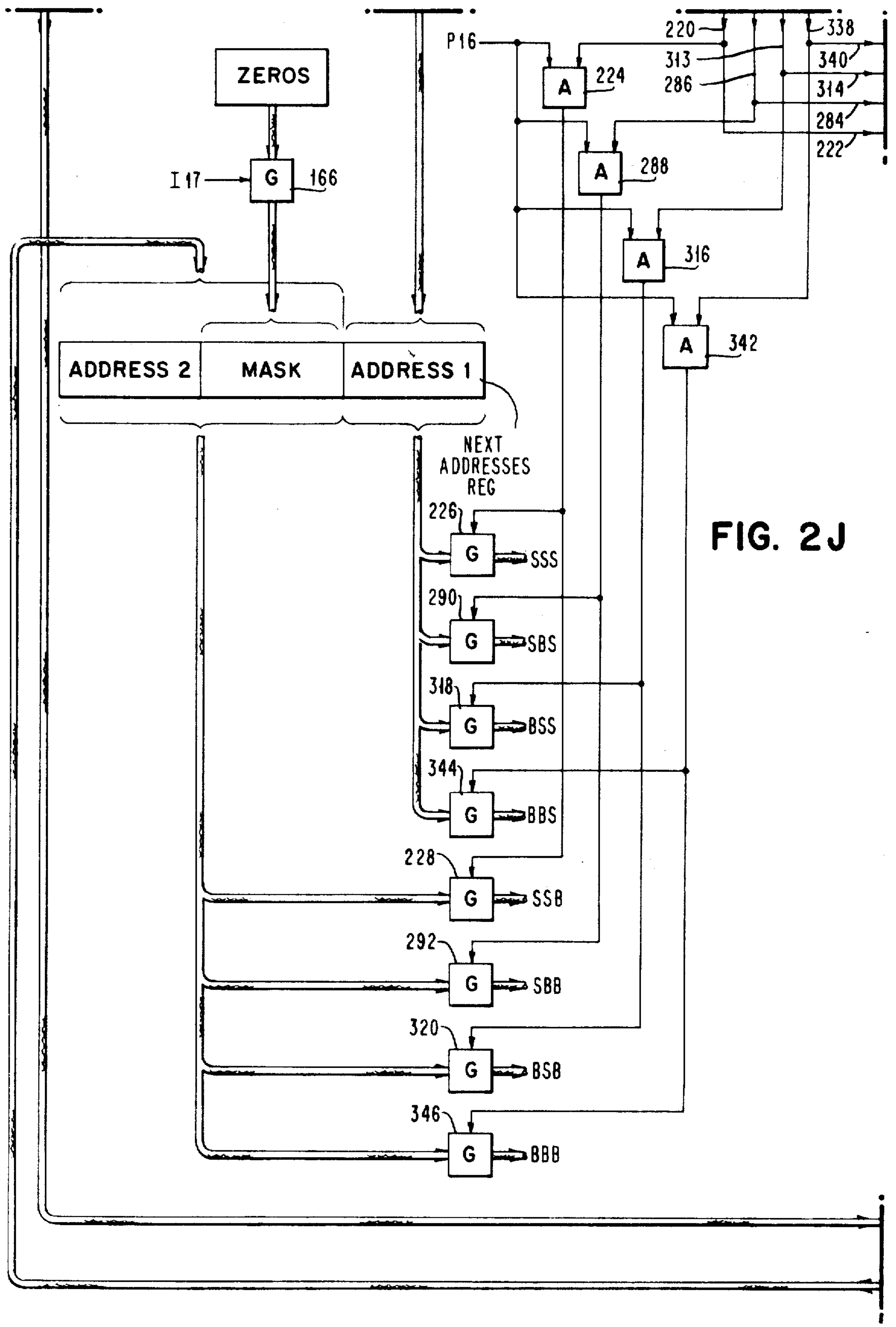
Figure 2K:
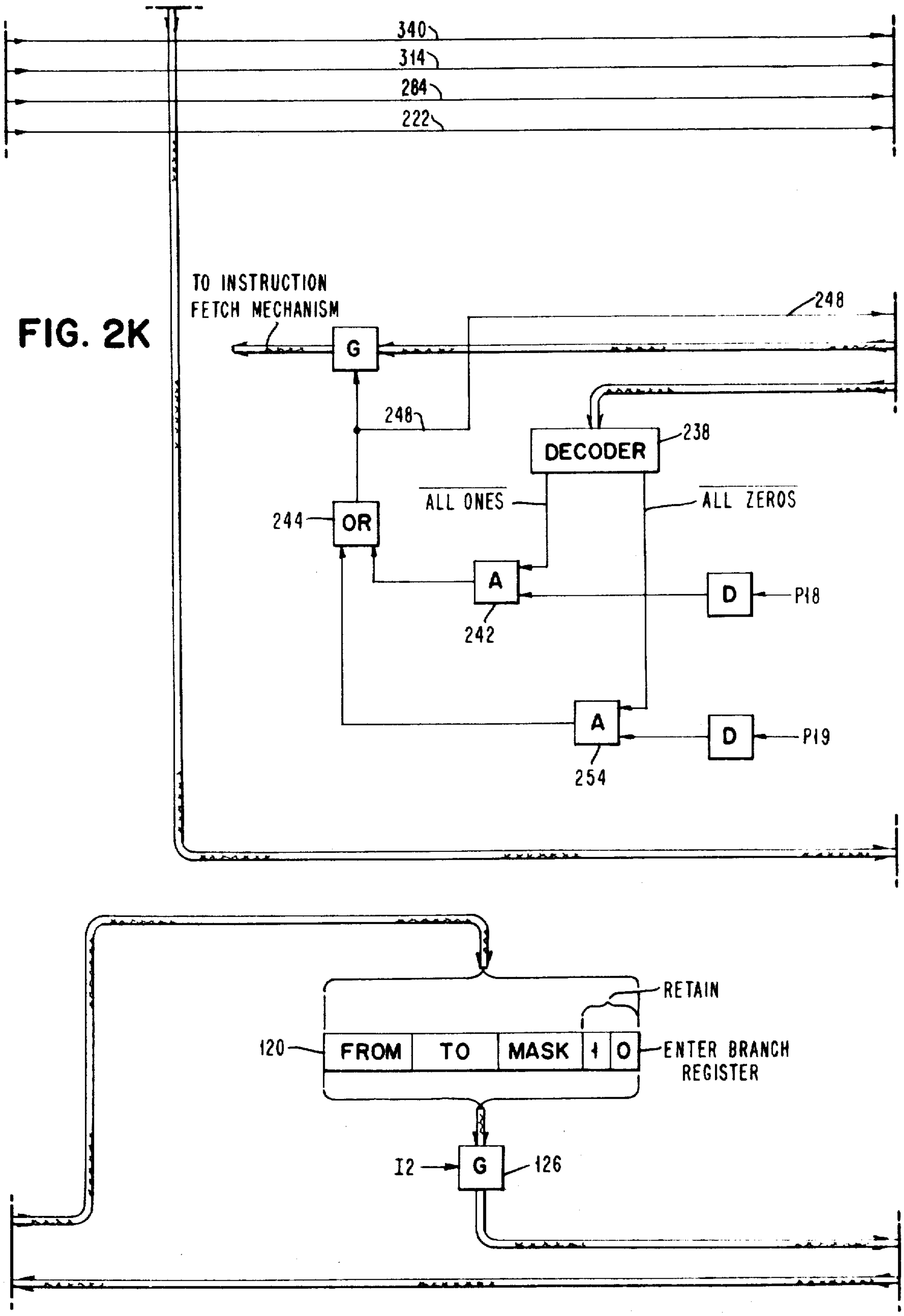
Figure 2L:
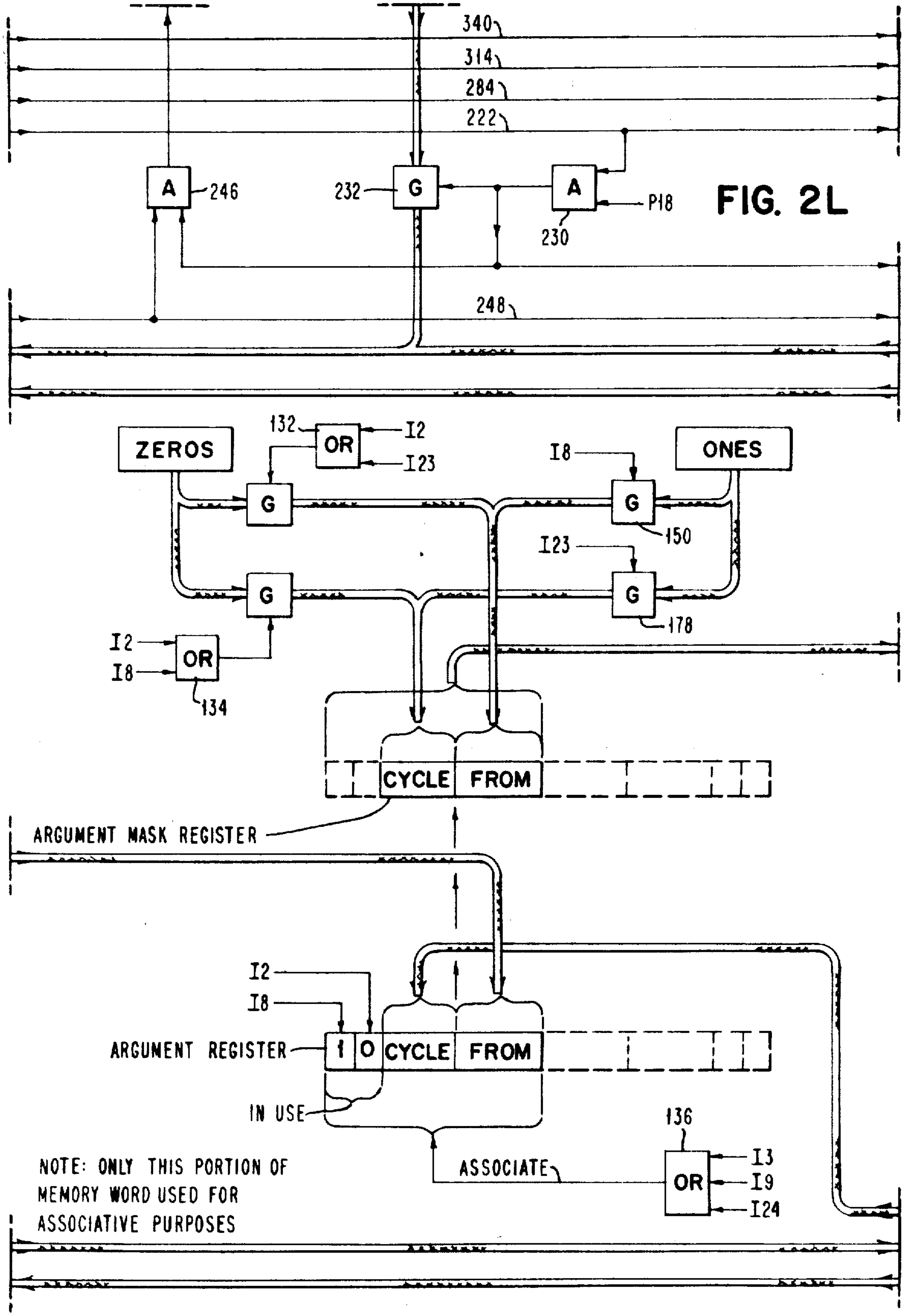
Figure 2M:
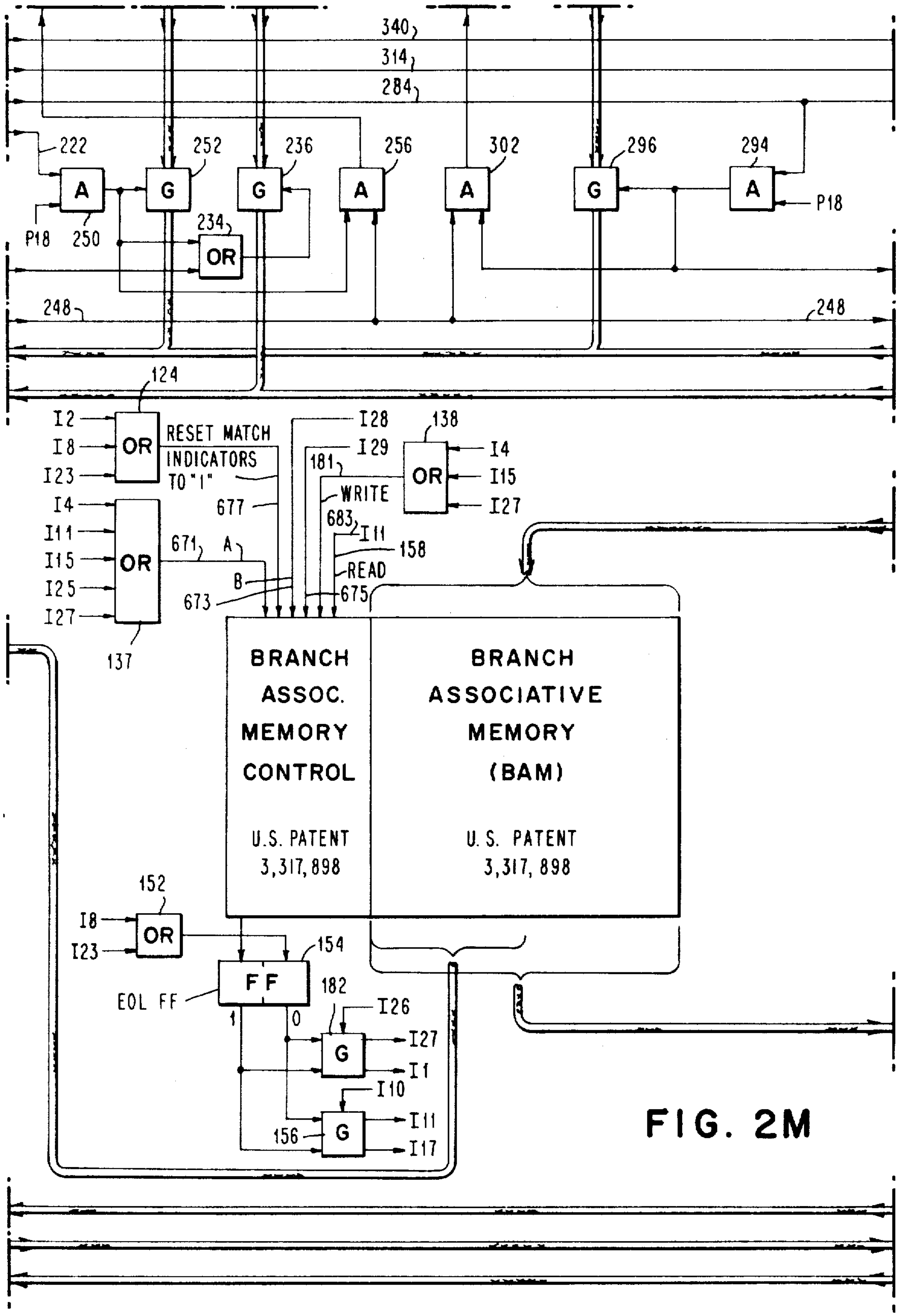
Figure 2N:
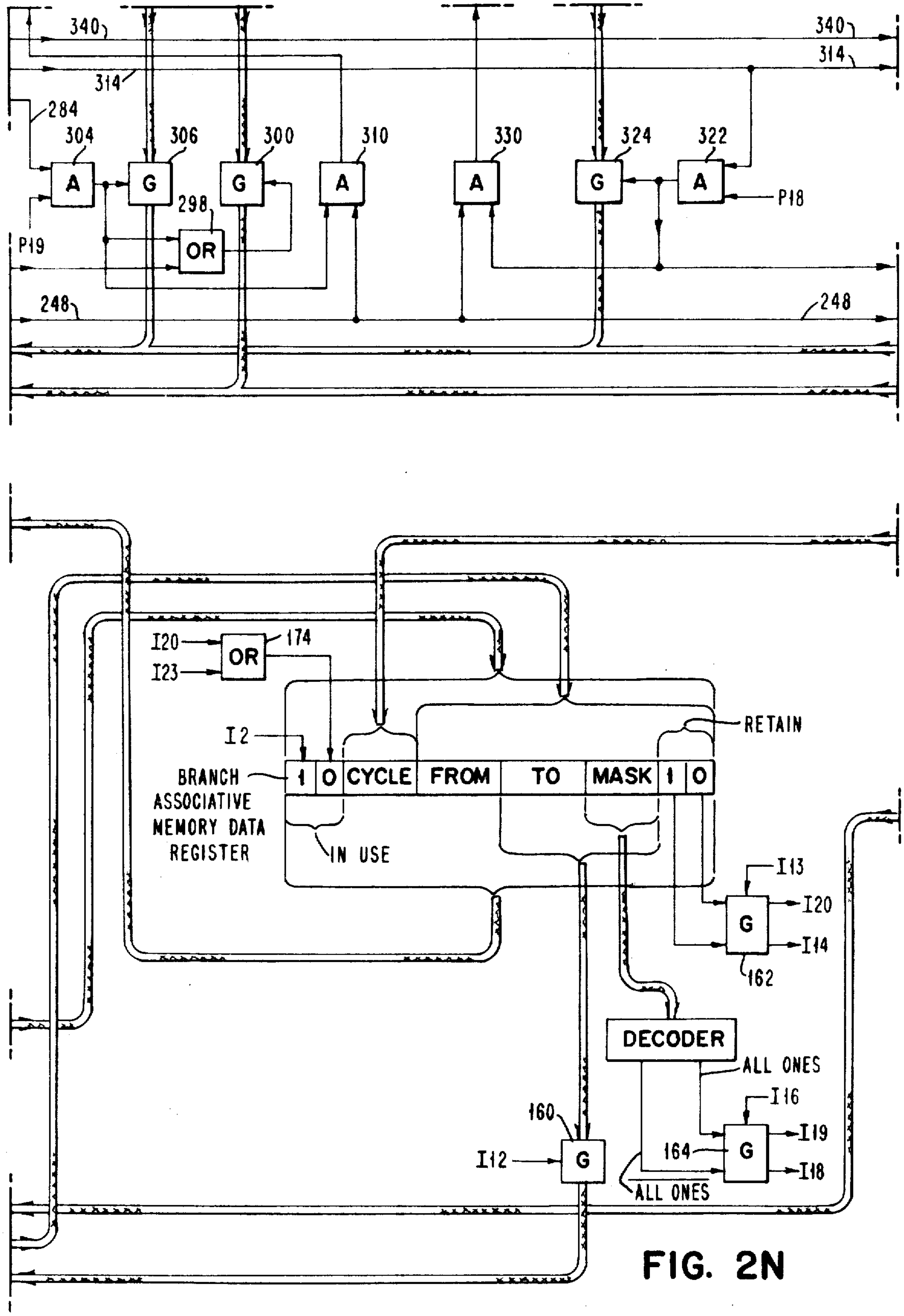

As will be described, the execution of an "Advance Branch" instruction causes information to be stored in a Branch Associative Memory Data Register; the format of this information word is shown in FIG. 2N. The "Cycle" field is used in getting rid of branching information along branches not taken and information no longer needed and is discussed below. The remaining fields contain the information in the corresponding fields of the "Advance Branch" instruction.

Figure 3:
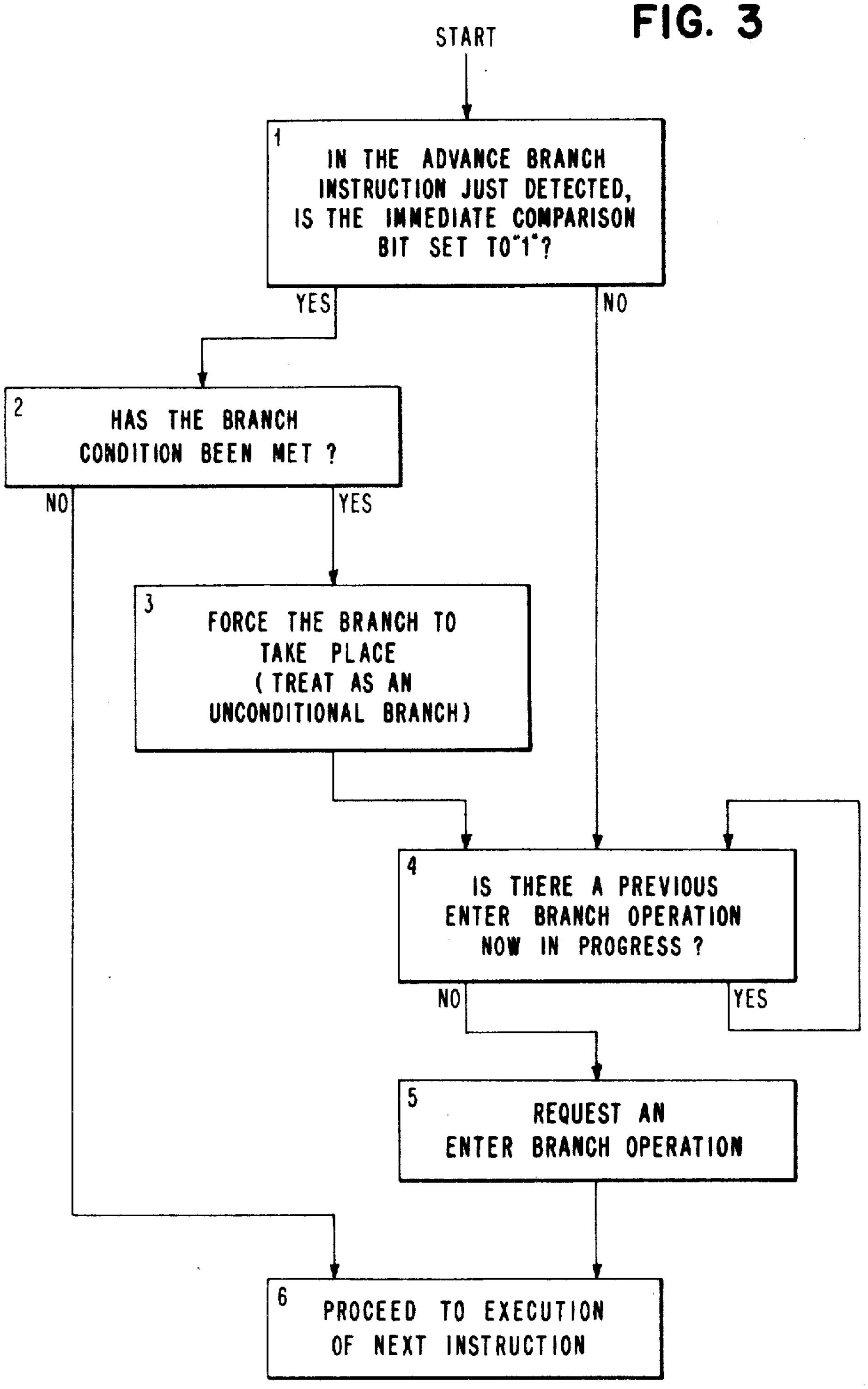
FIG. 3 comprises a flow chart of the operations occasioned by the detection of an "Advance Branch" instruction.

Referring to the flow charts, FIG. 3 describes the execution of an "Advance Branch" instruction. If the branch decision is to be made immediately (box 1) and it turns out that the branch is not to be taken (box 2), then nothing further is done for that instruction: the data contained in the "Advance Branch" is simply discarded. If, on the other hand, it turns out that the branch is definitely to be taken, then the "Mask" bits are all set to "1" (box 3), so that another comparison with the Condition Code, at any future time, will result in a decision to branch. Finally, if an "Immediate Comparison" with the Condition Code is not to be made, the mask remains unchanged. In the latter two cases, the branching information is passed on to the mechanism for generating instruction addresses. An interlock (boxes 4 and 5) prevents overwriting information previously passed on but not yet absorbed by the instruction address generating mechanism.

Figure 4:
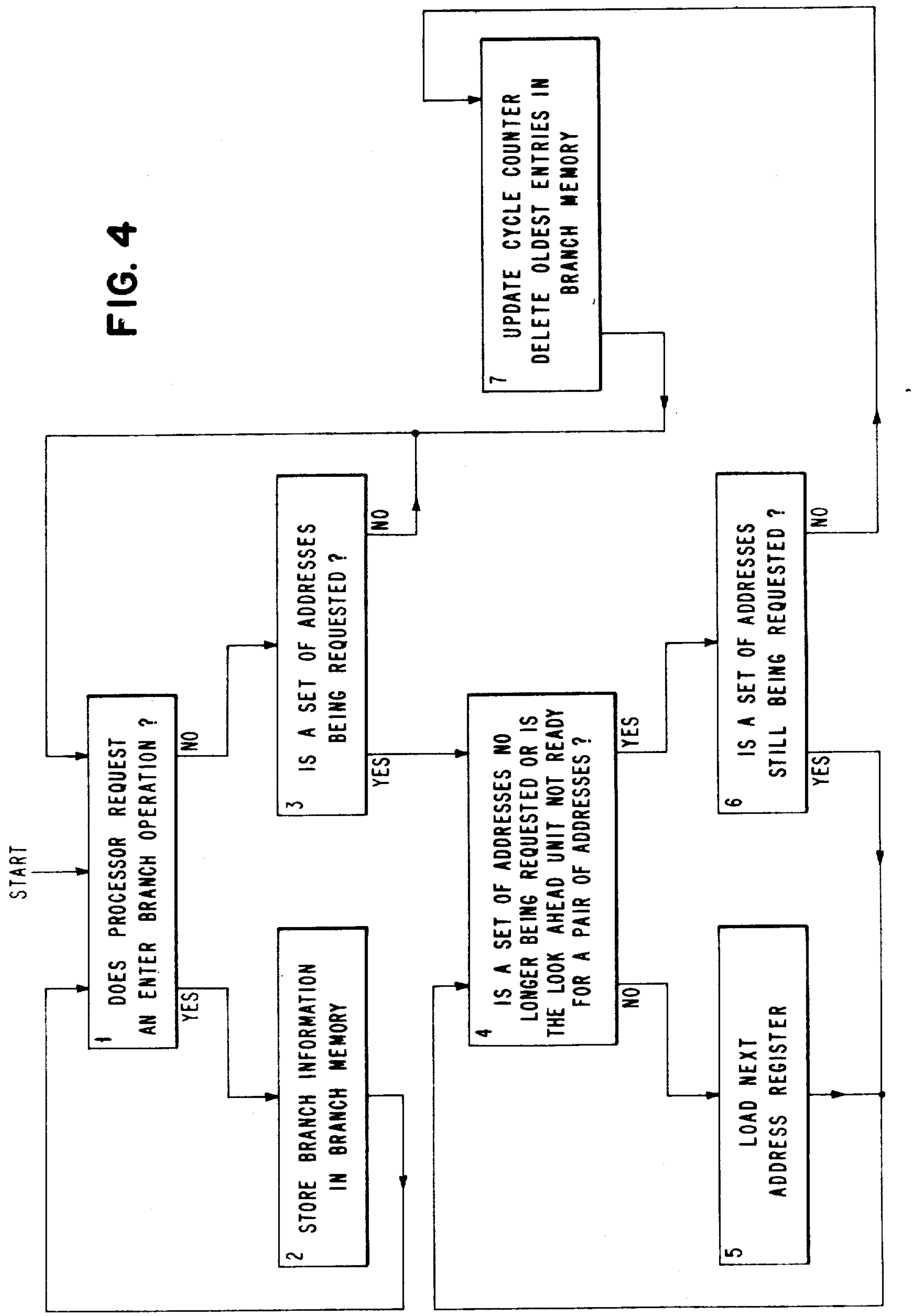
FIG. 4 comprises a flow chart illustrating the sequence of events for the instruction address generation mechanism.
Figure 5:
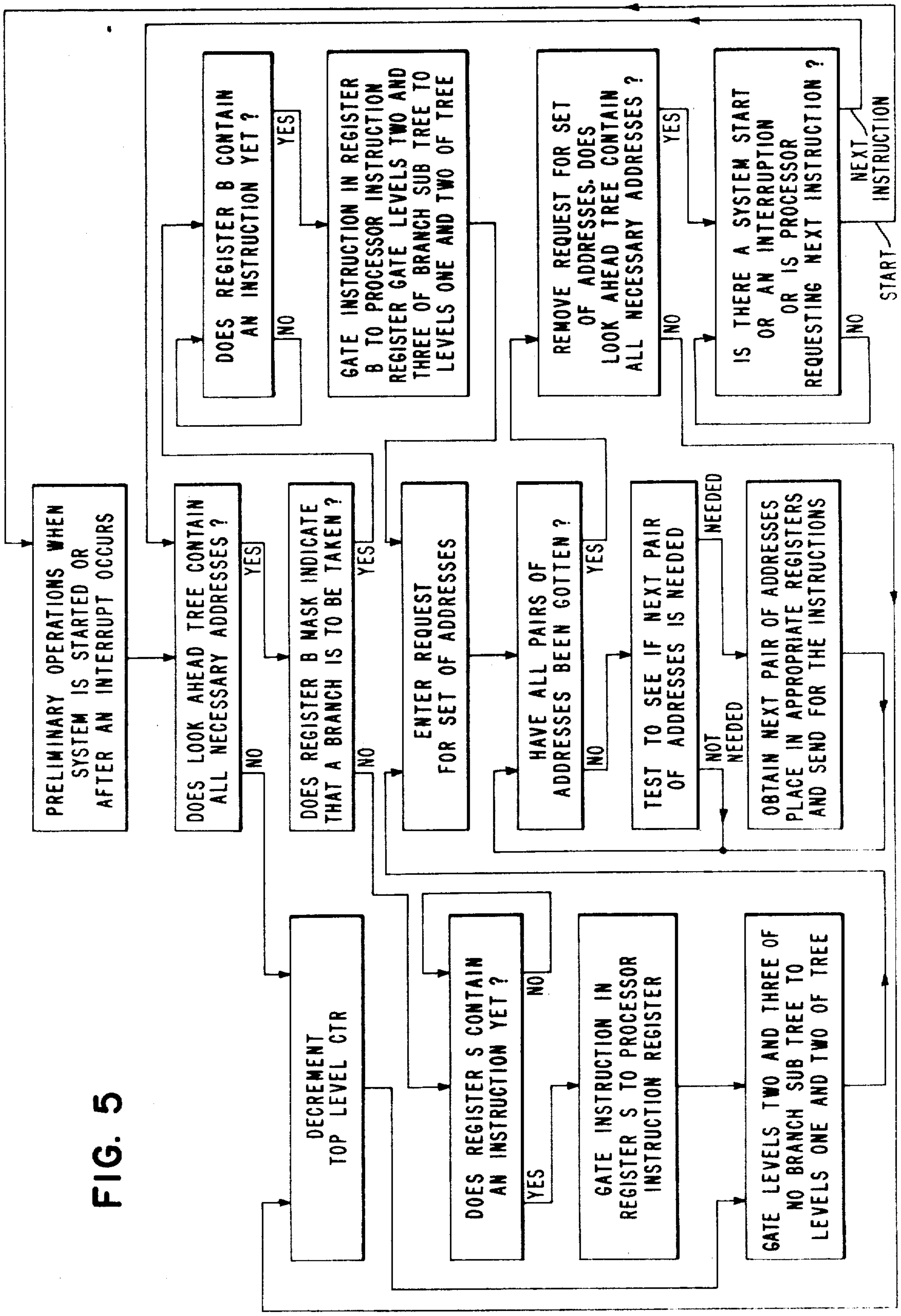
FIG. 5 comprises a flow chart illustrating the sequence of events which occur when the processor requests the next instruction from the look-ahead unit.

When the processor finishes executing an instruction, it asks the look-ahead mechanism for the next one; the response to this request is shown in FIG. 5. The decision as to whether to branch is made; if it has already been made it will be confirmed. As will be seen below, if no "Advance Branch" instruction ever referred to this point in the instruction stream, so that there can be no question of branching somewhere, then the "Mask" hits in Register B will be all "0's." Once the proper path has been determined, the mechanism must wait if the proper instruction has not been received from storage yet. Otherwise, it passes the instruction on to the processor and informs the instruction address generating mechanism that the processor has moved along one notch in the instruction stream. It also replaces levels 1 and 2 of the Look-ahead Tree by levels 2 and 3 of the appropriate sub-tree. Finally, it refills level 3, determining from the "Mask" fields in level 2 which paths are possible, getting the required addresses from the instruction address generating mechanism, FIG. 4, and requesting the instructions at those addresses from storage. The Request Addresses (see FIG. 2D) and Addresses Ready flip-flops (see FIG. 2C) are employed to coordinate the uses of the Request Addresses and Next Addresses registers by the two mechanisms.

It will be noted that in this embodiment the "Advance Branch" instruction must appear at least four steps before the point to which it refers. Otherwise, when the instruction address generating mechanism is queried by the look-ahead mechanism about successors at this point, it will not yet have received the branching information contained in the "Advance Branch" instruction, and consequently will indicate no branch. This restriction has been shown in the present embodiment only for simplicity and clarity of presentation. Anyone skilled in the art could eliminate it, for example by having the processor send advance branch information to the look-ahead mechanism also, which could check it against the Look-ahead Tree and initiate any necessary additional filling of the tree.

Since in the Look-ahead Tree there are only two successors for each instruction, it is implied that no two active "Advance Branch" instructions can have the same "From" address. However, a person skilled in the art could remove this restriction by putting a tag in the instruction indicating precedence where several Advance Branches have the same "From" address, by causing this tag also to be stored in the Branch Associative Memory and used appropriately, and by enlarging the Look-ahead Tree.

In the present embodiment there is also implied provision for ordinary branch insrtuctions. When such a branch is encountered the Look-ahead Tree must be cleared out and refilled, just as when the system is started or after an interruption.

Other actions familiar in the art, such as calculating indices and effective addresses and prefetching data, could easily be added to this implementation.

Finally, if a read-only code convention were adhered to, a few address comparisons could be used to insure that only one instruction fetch from storage is made for all occurrences of a given address appearing concurrently in the Look-ahead Tree.

FIG. 4 shows the mechanism for generating instruction addresses. There are two basic loops. One of them (boxes 1 and 2) accepts branch information from the processor and stores it in the Branch (Associative) Memory. The other supplies instruction addresses to the look-ahead unit (boxes 4, 5 and 6) and deletes obsolete branch information from the Branch (Associative) Memory (boxes 6 and 7).

Figure 20:
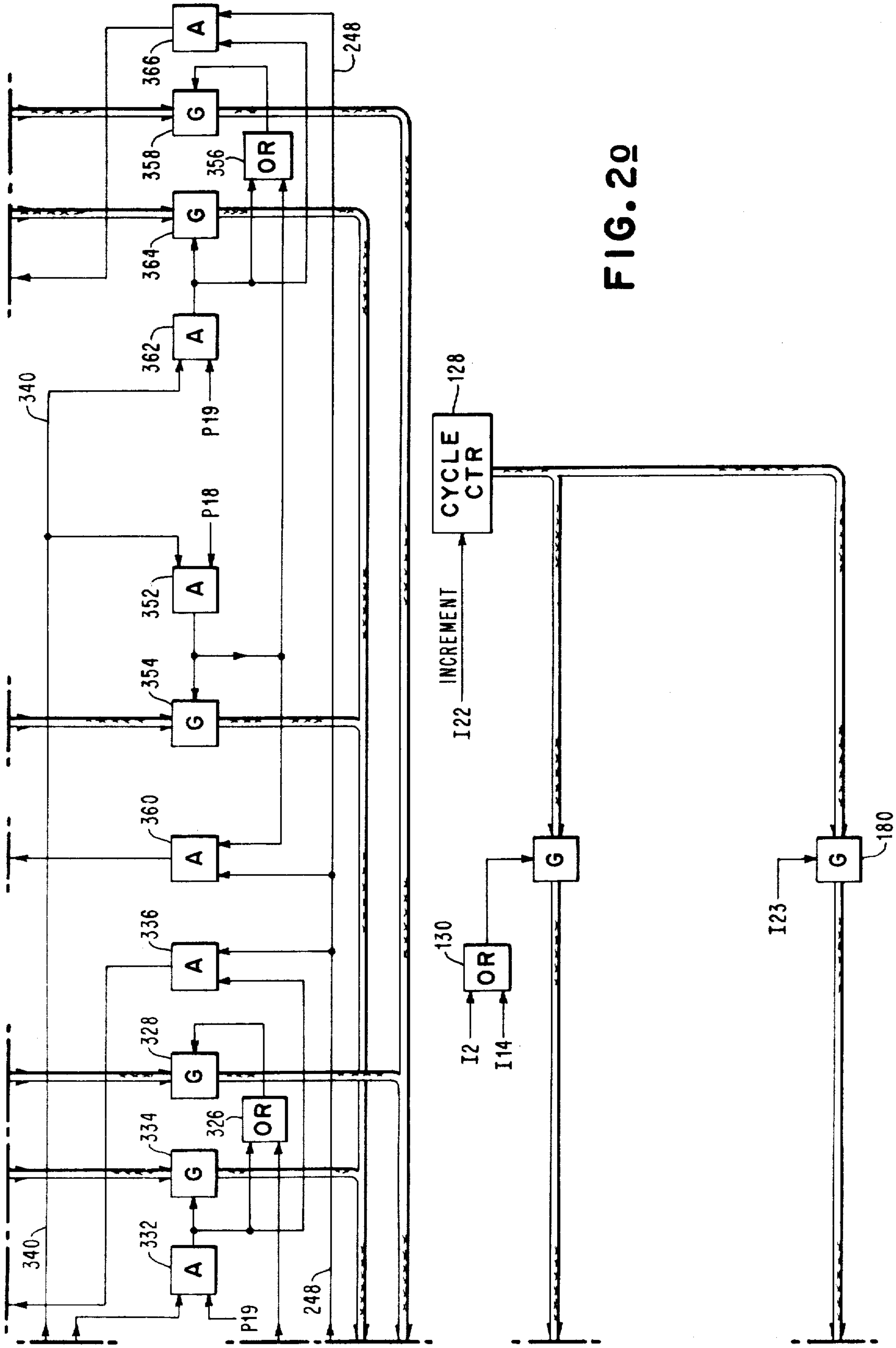

In the present embodiment, the clogging of the Branch Memory with obsolete branch information—for instance, branches along a path not taken—is prevented, by limiting the effective range of an "Advance Branch" instruction to eight processor instruction cycles. That is, if branch information is not used for eight cycles it is deleted from the Branch Associative Memory. The three-bit cycle counter 128 on FIG. 20 is used to keep track of processor instruction cycles. It is incremented by one each time the processor requests a new instruction from the look-ahead unit, as indicated by the look-ahead unit's setting the Next Cycle flip-flop to "1." Each time branch information is received from the processor, the current value of the Cycle Counter is stored with it. Each time the Cycle Counter is incremented, those entries whose "Cycle" field is equal to the new value of the counter are deleted. When branch information is used, if the "Retain" bit is zero, it is deleted from the Branch Memory (so that it is used but once); otherwise, it is stored again, but with the *current* value of the Cycle Counter placed in the "Cycle" field. Thus a loop whose length is not more than eight can be executed many times under the control of an "Advance Branch" instruction which is executed only once. The number eight is, of course an arbitary one selected for the present embodiment.

Since at each cycle at most five entries with that cycle number can be made in the associative memory (one from an Advance Branch execution and one restored for each entry of level 2 of the Look-ahead Three), if the Branch Associative Memory contains at least forty words, there will always be a place to store new Advance Branch information. Therefore, no check is made of the "In Use" field to see if storage room is available in the Branch Associative Memory at this point.

Anyone skilled in the art could devise alternate schemes to prevent the clogging of the Branch Associative Memory. For example, all entries could be kept until the memory was full, and thereafter each new entry could replace the oldest unused entry. Also, one could require that no branch points occur between an ("Advance Branch" instruction and the branch point to which it occurs, and provide logic to clear unused branches from the memory when unused paths are discarded from the Look-ahead Tree.

Figure 1:
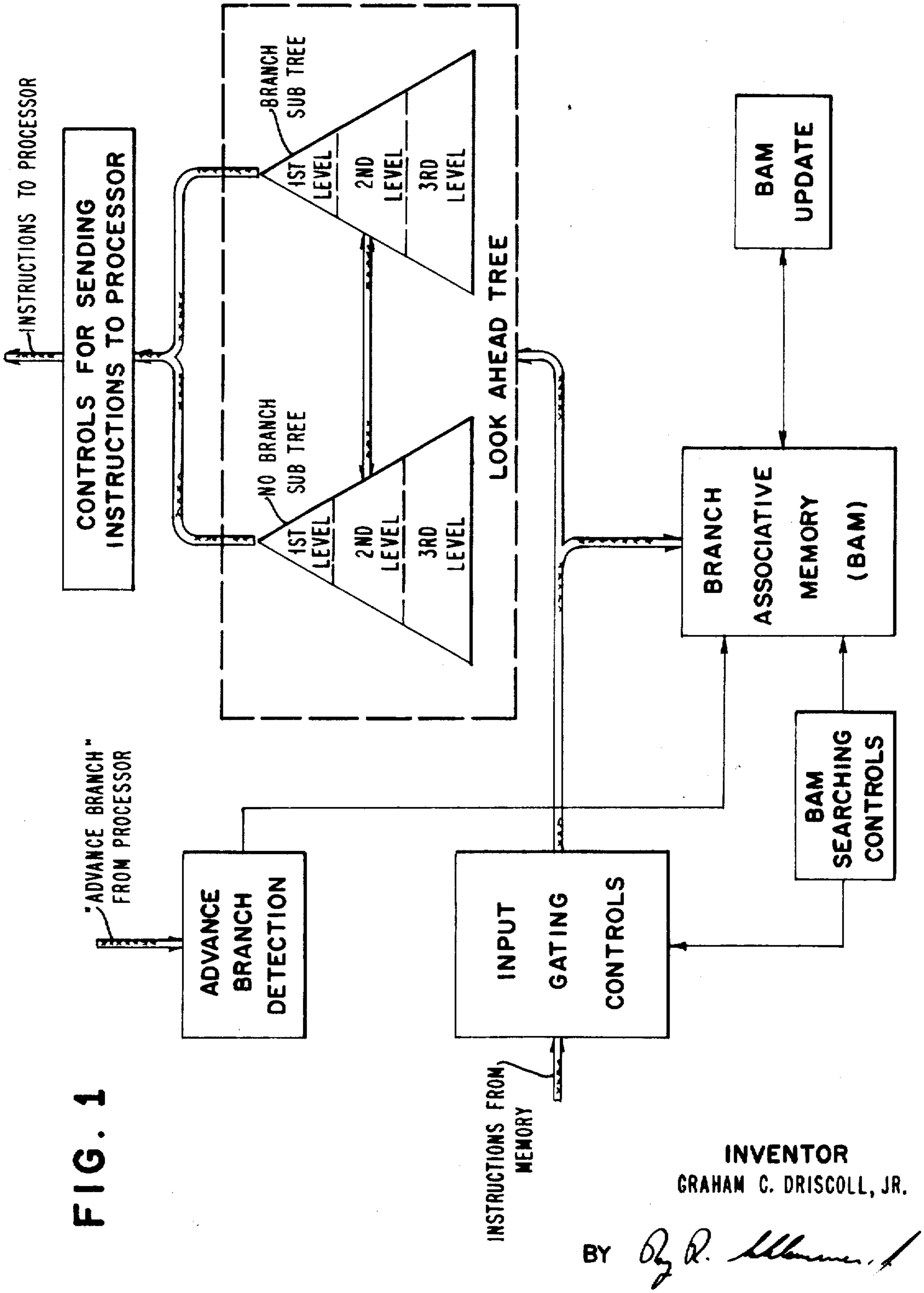
FIG. 1 comprises a functional block diagram of the present look-ahead branch detection system.

Referring now to FIG. 1, there is shown a generalized functional block diagram of the major portions of the embodiment of the present invention set forth in FIGS. 2A–20. As stated previously, this embodiment is considered to be exemplary in nature as many changes in the specific hardware configurations could be made without departing from the basic teachings of the present invention. Referring first to the dotted block entitled "Look-ahead Tree." This refers to a series of 14 storage registers which comprise the local or buffer instruction store for the present look-ahead system. It is from the top of this tree that instructions are actually transferred to the Processor upon command. Each of the two triangular blocks within the Look-ahead Tree entiled the No Branch Subtree and the Branch Subtree refer to the two sets of registers whose specific operation is explained subsequently with respect to FIG. 2 but which generally are utilized to transfer those instructions to the processor which are in a sequential relationship to the previous instruction or a branch relationship to the previous instruction respectively. That is if the next instruction to be transferred to the Processor relative to the one currently within the Processor is sequential, it will come from the No Branch Subtree or if the next instruction is not sequential, i.e., is the first instruction of a branch or loop, it will be transferred from the top of the Branch Subtree. As will be apparent from the subsequent description, within the second and third levels of each Subtree, the sequential and branch instructions will be intermixed in accordance with the particular instruction list being processed. The box marked Control for Sending Instructions to Processor determines whether an instruction from the No Branch Subtree or from the Branch Subtree, first Level in both cases, is to be sent to the Processor assuming there is an instruction in each location.

In the upper left hand portion of the figure a block entitled Advance Branch Detection includes that portion of the control circuitry of the present invention which accepts signals from the main processor Instruction Register and specifically from the Decoder therein which detects that a particular instruction being processed is an "Advance Branch" instruction. It makes certain tests on the Advance Branch instruction to see if a branch is absolute, is to be ignored, etc. as will be explained more fully subsequently and includes the controls necessary for storing certain portions of this instruction in the Branch Associative Memory (BAM) together with the contents of a Cycle Counter which is utilized to avoid overloading the BAM which holds the branch instructions. This "cycle" field is periodically searched by the block entitled BAM Update wherein the current setting of the cycle counter is associatively compared with the count field of all of the entries stored in the memory and upon a comparison a particular entry will be effectively deleted from said memory. The block marked Input Gating Controls for Look-ahead Tree includes the various memory accessing controls and sequencing clocks, etc. for sequentially accessing the memory for instruction addresses and for loading these addresses into the appropriate registers of the Look-ahead Tree. It also includes the controls for accessing the BAM as each new instruction address is called for by the system to determine whether or not it is a branch point.

The box marked BAM Searching Controls refers to that portion of the circuitry of the BAM which allows the associative comparison operations to occur, the primary one for the input examination being a comparison between the address of a particular instruction and the "From" address field stored in the BAM which indicates branch points in the instruction stream as set forth previously.

General description of FIGS. 2A–2O

Before proceeding with the detailed description of the operation of the presently disclosed embodiment shown in FIGS. 2A–2O, the following will be a general description of the major functional components shown in this composite logical schematic diagram of the present embodiment which it is thought will provide the reader with a general overall picture of the operation of the present embodiment.

Referring first to FIG. 2A it will be noted that this sheet also contains the composite diagram indicated as FIG. 2. This diagram merely illustrates the organization of FIGS. 2A–2O which comprises the complete logical schematic diagram of the system. In the subsequent description of this figure, unless a particular figure number is being referred to, the composite figure will generally be referred to a FIG. 2 and it is to be understood that the overall logical schematic is being referred to and not the organizational drawing.

In the upper portion of FIG. 2A, the Processor Instruction Register is indicated together with, as stated previously, an indication of the format of the "Advance Branch" instruction. Although this register is indicated as being in the present look-ahead unit, it should be understood that it is actually located in the processor and that the "Op Code" Decoder of the central processor will have in actuality far more outputs than the "Advance Branch" output indicated. However, this is the only output relevant to the present invention and is accordingly the only one shown. The remaining controls on FIG. 2A perform essentially the function of indicating that an "Advance Branch" instruction has been encountered and that it must be stored in the BAM.

FIG. 2B contains the "Condition Code" Register which would also be located in the Processor and would be set by instructions previously encountered and executed within the Processor. However, in the present system in order to determine whether a branch is or is not to be taken, unless a branch is stated to be absolute, means must be provided for determining if the branch condition has been met. This is done by comparing the Mask accompanying the various branch instructions with the contents of the Condition Code Register. This comparison, as will be explained more fully subsequently, may be made initially upon the receipt of an "Advance Branch" instruction or may be done when the processor finishes executing the instruction at the "Branch From" address.

Referring to FIGS. 2C, 2D and 2J, a number of the controls for loading the third level of the Look-ahead Tree are shown. In FIG. 2D the Request Addresses Register 148 is used to store instruction addresses currently in the second level to determine if they represent instructions immediately after which a branch is to be taken.

The next sequential address is generated by passing it through the Incrementor 170 on FIG. 2C where it becomes Address 1 in the Next Addresses Register on FIG. 2J. As will be apparent, the Adress 1 stored in this position of the Next Addresses Register is the next sequential address after the one currently tested in the second level of the Look-Ahead Tree. The contents of the Request Addresses Register is also transmitted into the Argument Register on FIG. 2L where it is tested against the contents of the BAM to see if it is a branch point. If the test is positive, the particular Branch Address entry will have been automatically gated to the BAM Data Register on FIG. 2N. The "To Address" and the "Mask" are transferred from this register into that portion of the Next Address Register indicated as Address 2 and the Mask. The contents of this register are appropriately gated to the proper registers in the third level of the Look-ahead Tree, said registers being determined by the contents of the particular register in the second level which is currently being tested.

The actual Look-ahead Tree Registers are shown on FIGS. 2E, 2F, 2G, 2H, and 2I. As stated previously, these 14 registers provide three levels of look-ahead. If it were desired to have more levels of look-ahead in view of an extremely rapid machine, it would be within the knowledge of a person skilled in the art to provide four or five or even more levels of look-ahead were this speed required by the computational speed of the Processor itself.

The Branch Associative Memory (BAM) is shown specifically on FIG. 2M. This is a relatively conventional associative memory in that a search may be conducted simultaneously on all of the words stored in said memory and a single successive compare will automatically be read out into the BAM Data Register shown on FIG. 2N. It should be noted that the particular segments of the word on which the search is to be made may be specified. Thus, in the present system if a memory update operation is being called for only the "In Use" bit and the "cycle" field would be searched so that only those words having the same contents in their "Cycle" field as is currently in the Cycle Counter, would be detected and brought out to the BAM Data Register and the "In Use" Bits reset to "0" and the words read back into the memory. When the "In Use" Bit is on "0," this in effect, means that this location now is an available storage location and the word would be merely written over on a subsequent storage cycle. Similarly, if it is desired to search for a particular address, i.e., the "From" Address, which indicates a branch point in the instruction stream, only that field (and the "In Use" bit) will be searched in the memory. As is stated subsequently in the detailed description of FIG. 2, the particular Branch Associative Memory utilized in the system is the same as that disclosed in U.S. Patent No. 3,317,898 of H. Hellerman issued May 2, 1967. However, it will be noted that a person skilled in the art could adapt any relatively conventional associative memory to accomplish substantially the same results.

The last major functional element in the system not previously described is the Enter Branch Register 120 on FIG. 2K. This register is merely a buffer which holds the required portions of a particular "Advance Branch" instruction which is transferred from the main Processor Instuction Register to this register 120. It will be noted that only the "From Address," the "To Address," the "Mask" and the "Retain" fields are actually transferred from the processor as described previously. The contents of this register are subsequently transferred to the BAM Data Register where an additional Use Bit and "Cycle" field are added to the word to be subsequently stored in the Branch Associative Memory.

Detailed description of FIG. 2

The subsequent detailed description of the operation of the present embodiment, as set forth in FIG. 2, specifically describes the operation of the present system traversing through the 3 basic clock sequences. Reference should be made to the Timing Sequence Charts immediately succeeding this section in order that the specific functions of each timing pulse may be more readily appreciated.

The Advance Branch Clock (abbreviated "A") is started every time an instruction is loaded into the Instruction Register 100 on FIG. 2A. The flow chart for this Advance Branch Clock is shown on FIG. 3. The A–1 pulse is applied to AND circuit 102 in order to test for an Advance Branch and also the condition that the Immediate Comparison bit is on "1." If this test is successful, the clock advances to A–2. The A–1 pulse is also applied to AND circuit 104 which tests for an Advance Branch and also the fact that the Immediate Comparison bit is on "0." If this test is successful the clock branches to A–4. The A–1 pulse also tests AND circuit 106 which has an output if the instruction is not an "Advance Branch." If this condition is true, the processor itself proceeds to examine the instruction by conventional circuitry which is not part of this invention: another clock located in the computer causes the contents of the Instruction Register to be decoded in a conventional manner. The A–2 pulse is applied to gate 108 (FIG. 2B) which sets up the comparison between the mask bits of the Advance Branch instruction and the Condition Code which is in register 110. A delayed A–2 pulse is applied to gate 112 in order to test the output of OR circuit 114 (FIG. 2B). If OR circuit 114 has no output, the A clock ends and the machine proceeds to examine the next instruction. If OR circuit 114 has an output, the clock will advance to A–3.

The clock pulse A–3 sets all the mask bits to "1."

The A clock would now like to store part of the contents of Instruction Register 100 (FIG. 2A) into the Branch Associative Memory. However, it must first test the Enter Branch flip-flop 116 on FIG. 2A. This is to see if a previous Enter Branch operation is being done. If flip-flop 116 is on "1" the clock will advance to A–5 which is for delay only and which will return it to A–4. If flip-flop 116 is on "0" the clock will advance to A–6. The clock pulse A–6 is applied to gate 118 (FIG. 2A) in order to gate the "From," the "To," the "Mask" and the "Retain" fields from Instruction Register 100 to Enter Branch Register 120 which is at the bottom of FIG. 2K. The A clock next advances to A–7 which sets flip-flop 116 to "1." This is the end of the A clock.

The next sequence that will be described is called the Instruction Address Generation Clock and this is abbreviated "I." The flow chart for this clock is on FIG. 4. The I–1 pulse tests flip-flops 116 by applying its pulse to gate 122 also on FIG. 2A. If flip-flop 116 is on "0," the clock will branch to I–5. If flip-flop 116 is on "1," the clock will continue to I–2. Assuming that the clock did advance to I–2, I–2 is applied to OR circuit 124 (FIG. 2M) in order to reset the match indicators in the Branch Associative Memory to their "1" state. I–2 is also applied to gate 126 (FIG. 2K) in order to gate the contents of register 120 to the Branch Associative Memory Data Register which is on FIG. 2N. I–2 is also used to set the "In Use" field of the Branch Associative Memory Data Register to its "1" state. I–2 is also applied to OR circuit 130 (FIG. 20) in order to gate the cycle counter 128 to to the cycle field of the Branch Associative Memory Data Register. On FIG. 2L, I–2 is applied to OR circuits 132 and 134 in order to gate "0's" to both fields of the Argument Mask Register. Again on FIG. 2L, I–2 is used to set the "In Use" field of the Argument Register to its "0" state. The clock now advances to I–3.

On FIG. 2A, I–3 is used to set flip-flop 116 to its "0" state. On FIG. 2L, I–3 is applied to OR circuit 136 in order to perform an association operation on the Branch Associative Memory. This is to find the top-most empty space in the Branch Associative Memory. The clock advances next to I–4.

On FIG. 2M, I–4 is applied to OR circuits 137 and 138 in order to perform a Write Operation in the Branch Associative Memory. In connection with the Write Operation, it is assumed that the Branch Associative Memory is big enough so that there is always at least one empty space. For this reason, it is not necessary to test the Branch Associative Memory to see if there is a vacant space to receive the data on this Write Operation.

The I clock next returns to I–1 in order to test flip-flop 116 again. If this flip-flop is now on "0" the clock branch to I–5.

On FIG. 2D I–5 is applied to gate 140 in order to test Next Cycle flip-flop 142. If flip-flop 142 is on "0" the clock will revert back to I–1. If flip-flop 142 is on "1" the clock will advance to I–6.

On FIG. 2D, I–6 is applied to gate 144 in order to test the condition of flip-flop 142 and Request Address flip-flop 146. If both of these flip-flops are on "1," the clock will advance to I–7. If either of these flip-flops are "0." the clock will branch to I–21. If it be assumed that the clock advances to I–7, it will be noted, again on FIG. 2D that I–7 is used to set flip-flop 146 to its "0" state. The clock next advances to I–8.

On FIG. 2D, I–8 is used to enable gate 149 to transfer the contents of register 148 to the Argument Register which is on FIG. 2L. In connection with the register 148 which is the Request Addresses Register, it can be said at this time that this reiister is loaded by the clock entitled "Processor Requests Next Instruction." This clock is abbreviated "P." On FIG. 2L, I–8 is applied to gate 150 in order to gate "1's" to the "from" field of the Argument Mask Register. Still on FIG. 2L I–8 applied to OR circuit 134 in order to gate "0's" to the "Ccle" field of the Argument Mask Register. At the lower left portion of FIG. 2M, I–8 is applied to OR circuit 152 in order to set flip-flop 154 to its "0" state. The clock next advances to I–9 which is applied to OR circuit 136 at the bottom right hand corner of FIG. 2L in order to obtain an association operation. The clock next advances to I–10 which is used to test flip-flop 154 (FIG. 2M). To do this, I–10 is applied to gate 156. If flip-flop 154 is in its "0" state, the clock will advance to I–11. If flip-flop 154 is in its "1" state, the clock will brach to I–17. The purpose of the association is to see if there is a word in the Branch Associative Memory which matches the "Form" field of the Argument Register. If there is a word in the Branch Associative Memory, flip-flop 154 will be left in its "0" state. If there is no word that matches in the memory then flip-flop 154 will be set to its "1" state.

Assuming that there is a word match in the Branch Associative Memory, I–11 is applied to OR circuit 137 (FIG. 2M) and to line 158 in order to obtain a "Read Access" of the Branch Associative Memory. The word read out will appear in the Branch Associative Memory Data Register on FIG. 2N.

The clock advances to I–12. On FIG. 2N, I–12 is applied to gate 160 in order to gate the "To" and the "Mask" fields from the Branch Associative Memory Data Register to the Next Addresses Register which is on FIG. 2J.

The clock advances to I–13. On FIG. 2N, I–13 is applied to gate 162 in order to test the "Retain" field of the Branch Associative Memory Data Register. If this flip-flop is on "0," the clock branches to I–20. If it is on "1" the clock advances to I–14.

Assuming that the clock advances to I–14, I–14 is applied to OR circuit 130 on FIG. 2O in order to gate the Cycle Counter 128 to the "Cycle field of the Branch Associative Memory Data Register.

The clock advances to I–15. On FIG. 2M, I–15 is applied to OR circuits 137 and 138 in order to obtain a Write Operation in the Branch Associative Memory.

The clock advances to I–16. On FIG. 2N, I–16 is applied to gate 164 in order to test the contents of the "Mask" field of the Branch Associative Memory Data Register. If the "Mask" field is all "1's," the clock branches to I–19. If the "Mask" field is not all "I's" the clock branches to I–18.

Going back to the clock step I–10 it will be noted that if there was no word in the Branch Associative Memory at that time, the clock would have branched to I–17. On FIG. 2J, I–17 is applied to gate 166 in order to gate "0's" to the "Mask" field of the Next Addresses Register. "0's" are used in the "Mask" field to indicate the absence of a branch instruction.

On FIG. 2C, I–18 is applied to gate 168 in order to gate the Request Addresses Register 148 through the Incrementor 170 to the right hand field of the Next Address Register on FIG. 2J. This is how the next sequential address is obtained.

The clock advances to I–19. On FIG. 2C, I–19 is applied to flip-flop 172 in order to set it to its "1" state.

Going back to clock step I–13, it will be noted that if the "Retain" bit of the Branch Associative Memory Data Register was on "0," the clock branches to I–20. On FIG. 2N, I–20 is applied to OR circuit 174 in order to set the "In Use" field to "0."

Going back to clock step I–6, it will be noted that if either or both of flip-flops 142 and 146 were in their "0" state the clock would branch to I–21. On FIG. 2D, I–21 is applied to gate 176 in order to test flip-flop 142. If flip-flop 142 is on "0," the clock will advance to I–22. If flip-flop 142 is on "1" the clock will branch back to I–6.

The clock step I–22 is used (FIG. 2O) to increment the Cycle Counter 128.

The clock advances to I–23. On FIG. 2L, I–23 is applied to gate 178 in order to gate "1's" to the "Cycle" field of the Argument Mask Register. I–23 is also applied to OR circuit 132 in order to gate "0's" to the "From" field of the Argument Mask Register. On FIG. 2O, I–23 is applied to gate 180 which gates the contents of the Cycle Counter 128 to the "Cycle" field of the Argument Register which is on FIG. 2L. I–23 also sets the "In Use" bit of the Argument Register to its "1" state. On FIG. 2N, I–23 is applied to OR circuit 174 in order to set the "In Use" bit of the Branch Associative Memory Data Register to "0." On FIG. 2M, I–23 is applied to OR circuit 124 which resets the match indicators to their "1" state. Also on FIG. 2M, I–23 is applied to OR circuit 152 which sets flip-flop 154 to its "0" state.

The clock advances to I–24 (FIG. 2L) which is applied to OR circuit 136 in order to perform an association operation.

The clock next advances to I–25 which again (FIG. 2M) is applied to the OR circuit 137 in order to apply an "A" pulse to the Branch Associative Memory Controls.

The clock next advances to I–26 which (FIG. 2M) is applied to gate 182 in order to test flip-flop 154. If flip-flop 154 is on "1," the clock will return to I–1.

Assuming that the clock did advance to I–27, I–27 is applied to OR circuits 137 and 138 in order to cause a Write Operation in the Branch Associative Memory.

The clock then advances to I–28 which is used to apply a "B" pulse to the Branch Associative Memory Controls.

The clock next advances to I–29 which is used to apply a "C" pulse to the Branch Associative Memory Controls. The clock then branches back to I–25 and repeats until all of the oldest entries in the Branch Associative Memory have been deleted.

The next sequence to be described will be the Processor Requests Next Instruction Clock which for convenience is called the "P" Clock. Reference should also be made to FIG. 5 which is the flow chart for the "P" clock. On FIG. 2D, the P–1 pulse is applied to flip-flop 186 in order to set it to its "0" state. Again on FIG. 2D the P-1 pulse is applied to gate 188 in order to gate "0's" to the "Mask" fields of all of the registers in the Look-ahead Trees which end with B. The registers in the Look-ahead Trees are shown on FIGS. 2E–2I. There are 14 registers in all. The left hand bit of each register is called the "Arrived" bit. The P–1 pulse is applied to set all of the left hand bits to "1" except the Register SSS on FIG. 2E which is set to "0." On FIG. 2C, the P–1 pulse sets the Top Level Counter to "3." Again on FIG. 2D, the P–1 pulse applied to gate 190 in order to gate the address of the first instruction to the "Address" field of the Register SSS. At the bottom of FIG. 2E, the P–1 pulse is applied to gate 192 in order to instruct an instruction fetch mechanism to get the instruction which is in the "Address" field of Register SSS. The mechanism for fetching instructions is not shown in this embodiment as it is not believed to be part of the invention and is notoriously well known in the art. When the instruction comes back from the memory portion of the system, the address comes back with it. The registers in the Look-Ahead Trees are then searched to find the address that matches the address coming back with the instruction. When a match is detected, the instruction is placed in the proper register in the field provided for the instruction. There is one further restriction on this operation. When addresses are sent to the instruction fetch mechanism the left hand bit of each register in level 3 of the Look-ahead Tree that requests an instruction, is set to "0." Thus, when the instruction comes back with its address, it must look for a register in the Look-ahead Tree which has the same address and also has its left hand bit set to "0." When the instruction is placed in a register of the Look-ahead Tree this left hand bit is then set to "1."

The clock advances next to P–2. On FIG. 2C the pulse P–2 is applied to gate 196 in order to test the Top Level Counter. If this counter is not on "1," the clock will advance to P–3. If the counter is on "1," the clock will advance to P–4. The Top Level Counter is used only in starting up operations (including operations immediately following an interruption or an ordinary branch). It is initially set to "3" and counts down to "1." It stays on "1" from that point on.

If the clock advances to P–3, on FIG. 2C, P–3 is applied to decrement the Top Level Counter.

From P–3 the clock branches to P–8. Clock pulses P–8 and P–8a move the "No-branch" Sub-tree upward as shown by the arrows on FIG. 8A.

The clock then advances to P–9. On FIG. 2D, P–9 is used to set Next Cycle flip-flop 142 to its "1" state. On FIG. 2E, P–9 is used to set the left hand bit of Register SSS to its "1" state. On FIG. 2F, P–9 is applied to OR circuit 198 in order to set the left hand bit of Register SSB to its "1" state. Again on FIG. 2F, the P–9 pulse is applied to OR circuit 200 in order to set the left hand bit of Register SBS to its "1" state. On FIG. 2G, the P–9 pulse is applied to OR circuit 202 in order to set the left hand bit of Register SBB to its "1" state. Again on FIG. 2G, the P–9 pulse is applied to OR circuit 204 in order to set the left hand bit of Register BSS to its "1" state. On FIG. 2H, the P–9 pulse is applied to OR circuit 206 in order to set the left hand bit of Register BSB to its "1" state. Again on FIG. 2H, the P–9 pulse is applied to OR circuit 208 in order to set the left hand bit of Register BBS to its "1" state. On FIG. 2I, the P–9 pulse is applied to OR circuit 210 in order to set the left hand bit of Register BBB to its "1" state. On FIG. 2C, the P–9 pulse is applied to Counter J in order to reset it to "0."

The clock next advances to P–10. On FIG. 2C, the pulse P–10 is applied to gate 212 in order to test Counter J. If Counter J is on "0," the clock will advance to P–11. If Counter J is on "1," the clock will branch to P–21. If the counter is on "2," the clock will branch to P–23. If the counter is on "3" the clock will branch to P–25 and if the counter is on "4" the clock will branch to P–27.

It will be assumed at this time that the clock advances to P–11. The clock pulse P–11 peforms a test as shown on FIG. 7 for loading Register SSS and Register SSB. In order to perform this test the pulse P–11 is applied to the gate 214 which is shown at the right side of FIG. 2I. If Register B is not all "1's" and Register SB is not all "1's," the clock will advance to P–12. Otherwise the clock will branch to P–20.

Assume that the clock advances to P–12. On FIG. 2E the P–12 pulse is applied to gate 216 in order to gate the "Address" field of the Register SS to the Request Addresses Register 148 on FIG. 2D.

The clock then advances to P–13. On FIG. 2D, P–13 is applied to flip-flop 146 in order to set it to its "1" state.

The clock next advances to P–14. On FIG. 2C, P–14 is applied to gate 218 in order to test Address Ready flip-flop 172. If flip-flop 172 is on "0," the clock will advance to P–15. If the flip-flop 172 is on "1" the clock will branch to P–16.

P–15 is used for delay only and returns the clocks to P–14.

In the sequence being described, Counter J is on "0." Therefore, line 220 in FIG. 2C will be active. A branch circuit extends from line 220 to line 222 which extends to FIG. 2M. On FIG. 2J when the P–16 pulse occurs it will pass through AND circuit 224 and enable gates 226 and 228. The right hand field of the Next Address Register will thus be gated into the address field of Register SSS and the two left hand fields of the Next Address Register will be gated into the "Address" and the "Mask" fields of Register SSB.

The clock advances to P–17. On FIG. 2C P–17 is applied to flip-flop 172 in order to set it to its "0" state.

The clock advances to P–18. On FIG. 2L, the P–18 pulse is applied to AND circuit 230 which is enabled because of the active state of line 222. Gate 232 will thus be enabled in order to gate the "Address" field of Register SSS to gate 240 on FIG. 2K. The P–18 pulse also extends through OR circuit 234 to enable gate 236. Gate 236 gates the "Mask" field of Register SSB to the Decoder 238. A delayed P–18 pulse tests AND circuit 242. If the "Mask" field in Register SSB is not all "1's" then AND circuit 242 will have an output which extends through the OR circuit 244 in order to enable gate 240 which passes the "Address" field of Register SSS to the instruction fetch mechanism. It will be noted that if OR circuit 244 as an output that it will extend via line 248 and pass through the AND circuit 246 in order to set the left hand bit of Register SSS on FIG. 2E to its "0" state.

The clock advances to P–19. Referring to FIG. 2M, because line 222 is active the P–19 pulse will pass through the AND circuit 250 in order to enable gate 252. A branch circuit extends via OR circuit 234 to enable gate 236. In this manner the "Address" field of Register SSB is gated to gate 240 (FIG. 2K). Because gate 236 is enabled, the "Mask" field of Register SSB will be gated to the Decoder 238. A delayed P–19 pulse tests the AND circuit 254. If the "Mask" field of Register SSB is not all "0's," then AND circuit 254 will have an output which passes through OR circuit 244 to again enable gate 240. A branch circuit extends via line 248 and passes through AND circuit 256 in order to set the left hand bit of Register SSB to its "0" state.

The clock then advances to pulse P–20 which (FIG. 2C) is used to increment Counter J.

Figures 6, 7:
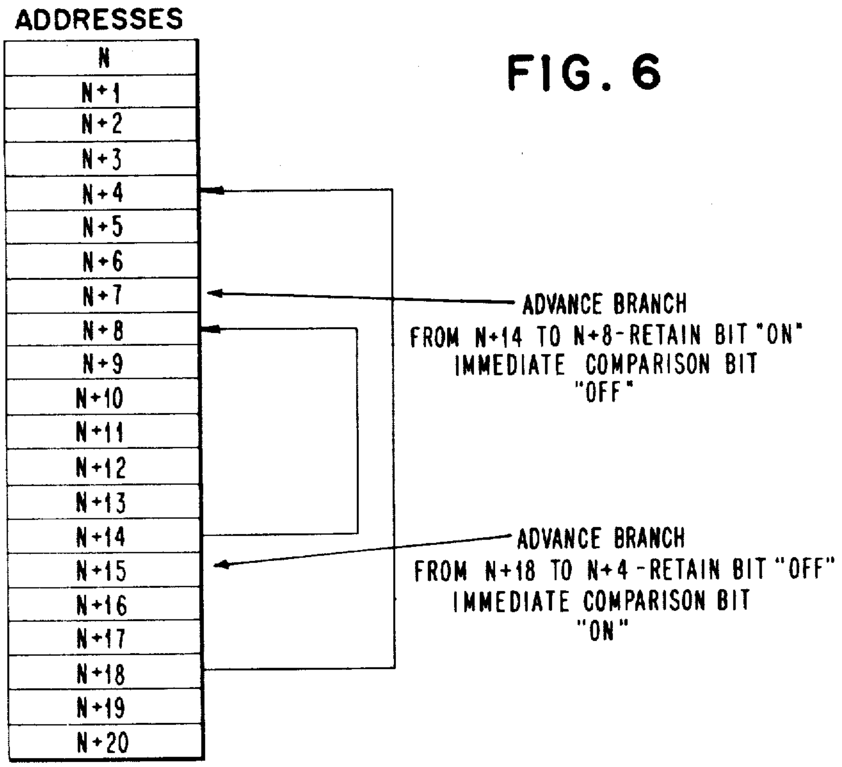
FIG. 6 is an illustrative example showing a typical sequence of system instructions with branch points and "Advance Branch" instructions preceding said branch points.
FIG. 7 is a chart showing the conditions under which the various registers in level 3 of the look-ahead tree require filling.

It will be noted that from P–20 the clock branches back to P–10 in order to load Registers SBS and SBB according to the rules on FIG. 7. The procedure is exactly the same as just described for Registers SSS and SSB. When the instructions have been requested for Registers SBS and SBB it will be noted that Counter J is again incremented in order to load registers BSS and BSB. Again, the procedure is exactly the same according to the rules on FIG. 7. When the instructions have been requested for Registers BSS and BSB Counter J is again incremented in order to load Registers BBS and BBB.

Again, the procedure is exactly the same as described before. When the instructions have been requested for Registers BBS and BBB, Counter J is again incremented. It will be noted that when this occurs, Counter J will be on "4." When gate 212 (FIG. 2C) is tested by the P–10 pulse, the clock will branch to P–27. On FIG. 2C, the P–27 pulse is applied to gate 258 in order to test the Top Level Counter. If the counter is not on "1," the clock will branch to P–3. If the counter is on "1," the clock will branch to P–32. On FIG. 2D, the P–27 pulse is applied to flip-flop 142 in order to set it to its "0" state.

The sequence of events starting with clock pulse P–3 has been described. They will be repeated until the Top Level Counter goes to "1," at which point it stays until a new start operation is initiated. Therefore, let it be asumed that the clock has branched to P–32. On FIG. 2D, P–32 is applied to gate 260 in order to test flip-flops 262 and 186. If both of these flip-flops are on "0", the clock will advance to P–33. Otherwise, the clock will branch to P–34.

P–33 is used for delay only and returns the clock to P–32. When the clock branches to P–34, P–34 will be applied to gate 264 (FIG. 2D) in order to test flip-flop 186. If flip-flop 186 is on "0," the clock will branch back to P–2. If flip-flop 186 is on "1," the clock will branch back to P–1. If the clock branches back to P–2, the Top Level Counter will again be tested; and if it is now on "1," the clock will branch to P–4. On FIG. 2B, P–4 is applied to gate 266 in order to compare the "Mask" field in Register B with the condition code which is stored in Register 110. A delayed P–4 pulse is applied to gate 268 (FIG. 2B) in order to test the result of this comparison. If the pattern of "Mask" bits in Register B does not "agree" with the condition code, the clock will branch to P–5. Otherwise, it will branch to P–28. What this means is that if there is a branch instruction in Register B and it has satisfied the branch condition, the instruction in the "Instruction" field of Register B will be sent to the Processor Instruction Register. If the branch is not taken, the instruction in Register S will be sent to the Processor Instruction Register. Assume that the clock has advanced to P–5.

On FIG. 2E, P–5 is applied to gate 270 in order to test the left hand bit of Register S. If the instruction has not arrived, this bit will be on "0"; and the clock will advance to P–6 which is used for delay only and which returns the clock to P–5. When the instruction has arrived, this bit will be on "1"; and the clock will branch to P–7 Also, on FIG. 2E, P–7 is applied to gate 272 which gates the instruction in Register S to the Processor Instruction Register. On FIG. 2D, P–7 is applied to the OR circuit 274 in order to set flip-flop 262 to its "0" state.

If the result of the test made in clock step P–4 is a branch to clock step P–28, the following things will happen. On FIG. 2H, clock step P–28 is applied to gate 276 in order to test the left hand bit of Register B. If the instruction has arrived, the clock will branch to P–30. P–30 is applied to gate 278 (also FIG. 2H) in order to gate the instruction in Register B to the Processor Instruction Register. On FIG. 2D, the P–30 pulse is applied to OR circuit 274 in order to set flip-flop 262 to its "0" state.

The events that occur when Counter J (FIG. 2C) is on "1," "2" and "3" will next be described. If Counter J is on "1" when it is tested by the pulse P–10, the clock will branch to P–21. The events starting with clock pulse P–21 involve the loading Register SBS and SBB and the sending for the appropriate instructions to be placed in these two registers. This is done according to the rules set forth in FIG. 7. On FIG. 2I clock pulse P–21 tests the output of AND circuit 280 by means of gate 281. If Register B is not all "1's" and Register SB is not all "0's," the clock will advance to P–22. If these conditions are not fulfilled, the clock will revert to P–20. Assuming that it does advance to P–22, the clock pulse P–22 is applied to gate 282 (FIG. 2F) in order to gate the "Address" field of Register SB to Register 148 on FIG. 2D.

At this point, the clock branches back to P–13. Clock pulses P–13, P–14, and P–15 have been previously described. Assume now that the clock is on P–16. Because Counter J is on "1," line 286 (FIG. 2C) will be active. A branch circuit extends from line 286 on the line labelled 284. Because line 286 is active, AND circuit 288 (FIG. 2J) will be enabled and when P–16 is applied to it, AND circuit 288 will have an output to enable gates 290 and 292 (FIG. 2J). Gate 290 will gate the right hand field of the Next Addresses Register to the "Address" field of Register SBS. AND circuit 292 will gate the two left hand fields of the Next Addresses Register to the "Address" and the "Mask" fields of Register SBB.

The clock advances to P–17. On FIG. 2, P–17 resets Address Ready flip-flop to its "0" state. The clock next advances to P–18. On FIG. 2M, because line 284 is active, AND circuit 294 will be enabled. When P–18 is applied to AND circuit 294, gate 296 will be enabled in order to gate the "Address" field of Register SBS to gate 240. AND circuit 294 will also have an output through OR circuit 298 (FIG. 2N) to enable gate 300 which gates the "Mask" field of Register SBB to the Decoder 238 (FIG. 2K). A delayed P–18 pulse is applied to AND circuit 242 (also FIG. 2K) which will have an output if the "Mask" field of Register SBB is not all "1's." The output of AND circuit 242 will extend through OR circuit 244 to enable gate 240 in order to send the address contained in Register SBS to the Instruction Fetch Mechanism. The output of OR circuit 244 will extend via line 248 to AND circuit 302 (FIG. 2M) which is enabled by the P–18 pulse in order to set the left hand bit of Register SBS to "0."

The clock next advances to P–19. Because line 284 is active, the pulse P–19 (FIG. 2N) will extend through AND circuit 304 to enable gate 306. A branch circuit extends through OR circuit 298 to enable gate 300. Gate 306 will gate the "Address" field of Register SBB to the Decoder 238. A delayed P–19 pulse is applied to AND circuit 254 (FIG. 2K) and, if the "Mask" field of Register SBB is not all "0's," AND circuit 254 will have an output which extends through OR circuit 244 to enable gate 240 in order to send the contents of the "Address" field of Register SBB to the Instruction Fetch Mechanism. The output of OR circuit 244 extends via line 248 to enable AND circuit 310 (FIG. 2N). The P–19 pulse will thus extend through AND circuit 310 to set the left hand bit of Register SBB to "0." The clock advances to P–20 which increments Counter J. Counter J will now be on "2" and line 313 will be active. A branch circuit extends from line 313 via line 314.

When the clock pulse P–10 tests Counter J, the clock will now branch to P–23. On FIG. 2I, the clock pulse P–23 is used to test the AND circuit 312 via Gate 311. If Register B is not all "0's" and Register BB is not all "1's," the clock will branch to P–24. Otherwise it will revert to P–20.

Assume that the clock branches to P–24. On FIG. 2H, P–24 is applied to gate 315 which gates the "Address" field of Register BS to Register 148 (FIG. 2D). The clock now branches back to P–13. P–13, P–14 and P–15 have already been described. On FIG. 2J, AND circuit 316 receives one input from line 312 which is active. When the P–16 pulse is applied to the other input of AND circuit 316, gates 318 and 320 will be enabled. Gate 318 (Also, FIG. 2J) will gate the right hand field of the Next Addresses Register to the "Address" field of Register BSS. Gate 320 will gate the two left hand fields on the Next Addresses Register to the "Address" and "Mask" fields of Register BSB. Referring to FIG. 2N, AND circuit 322 will have an output when P–18 is applied to it because line 314 is now active. Gate 324 will thus be enabled in order to gate the "Address" field of Register BSS to gate 240 (FIG. 2K). The output of AND circuit 322 will extend through OR circuit 326 (FIG. 2O) to enable gate 328 which gates the "Mask" field of Register BSB to the Decoder 238. A delayed P–18 pulse is applied to AND circuit 242 (FIG. 2K) which will have an output if the "Mask" field of Register BSB is not all "1's." This output will extend through OR circuit 242 to enable gate 240 which gates the "Address" field of Register BSS to the Instruction Fetch Mechanism. The output of OR circuit 244 extends via line 248 to enable AND circuit 330 (FIG. 2N). This will enable the P–18 pulse to extend through AND circuit 330 to set the left hand bit of Register BSS to its "0" state.

The clock advances to P–19 which, on FIG. 2O, is applied to AND circuit 332 which is enabled because line 314 is active. AND circuit 332 thus has an output to enable gate 334 and, via OR circuit 326 to enable gate 328. Gate 334 gates the "Address" field of Register BSB to gate 240 (FIG. 2K). Gate 328 gates the "Mask" field of Register BSB to the Decoder 238. A delayed P–19 pulse is applied to AND circuit 254 which will have an output if the "Mask" field of Register BSB is not all "0's." The output of AND circuit 254 will extend through OR circuit 244 to enable gate 240 in order to gate the "Address" field of Register BSB to the Instruction Fetch Mechanism. The output of OR circuit 244 extends via line 248 to enable AND circuit 336 (FIG. 2O). Thus, the P–19 pulse will extend through AND circuit 336 to set the left hand bit of Register BSB to "0."

When Counter J is again incremented, it will be on "4" and lines 338 (FIG. 2C) and 340 (FIG. 2J) will be active. The active state of line 338 enables AND circuit 342 (FIG. 2J) so that when P–16 is applied to it, gates 344 and 346 will be enabled. Gate 344 gates the right hand field of the Next Addresses Register to the "Address" field of Register BBS. Gate 346 gates the two left hand fields of the Next Addresses Register to the "Address" and the "Mask" fields of Register BBB.

It should also be noted that when gate 212 (FIG. 2C) is tested, this time by the clock pulse P–10, the clock branches to P–25. On FIG. 2I the clock pulse P–25 tests the AND circuit 348 via gate 349. According to the rules on FIG. 7, AND circuit 348 will have an output if the "Mask" field of Register B is not all "0's" and if the "Mask" field of Register BB is not all "0's." If this is true, the clock will advance to P–26. Clock pulse P–26 is applied to gate 350 (also FIG. 2I) in order to gate the "Address" field of Register BB to Register 148 (FIG. 2D). On FIG. 2O AND circuit 352 will have an output when P–18 is applied to it because now line 340 is active. The output of AND circuit 352 will enable gates 354 and, via OR circuit 356, gate 358. Gate 354 will gate the "Address" field of Register BBS to the gate 240. Gate 358 will gate the "Mask" field of Register BBB to the Decoder 238. A delayed P–18 pulse is applied to AND circuit 242 (all on FIG. 2K) which will have an output if the "Mask" field of Register BBB is not all "1's." The output of AND circuit 242 will extend through OR circuit 244 to enable gate 242 to gate the "Address" field of Register BBS to the Instruction Fetch Mechanism. The output of OR circuit 244 extends via wire 248 to enable AND circuit 360 (FIG. 2O) which allows the P–18 pulse to reset the left hand bit of Register BBS to its "0" state.

The clock advances to P–19. On FIG. 20, because line 340 is active, the P–19 pulse extends through AND circuit 362 to enable gate 364. The output of AND circuit 362 will also extend through OR circuit 356 to enable gate 358. Gate 364 will gate the "Address" field of register BBB to the gate 240. Gate 358 will gate the "Mask" field of Register BBB to the Decoder 238. A delayed P–19 is applied to AND circuit 254 (all on FIG. 2K) which will have an output if the "Mask" field of Register BBB is not all "0's." This output will extend through OR circuit 244 to enable gate 240 which will gate the "Address" field of Register BBB to the Instruction Fetch Mechanism. The output of OR circuit 244 extends via wire 248 to AND circuit 366 (FIG. 2O). This enables the P–19 pulse to pass through AND circuit 366 and set the left hand bit of Register BBB to its "0" state.

Branch memory

The Branch Associative Memory shown on FIG. 2M may be of the type disclosed and described in previously referred U.S. Pat. No. 3,317,898. The Branch Associative Memory Control is the same as FIG. 4*a* of said U.S. Pat. No. 3,317,898 and the Branch Associative Memory proper is the same as FIG. 4*b* of said patent. The reference characters 671, 673, 675, 677, 681 and 683 on the lines going into the top of the Branch Associative Memory Control perform the same function as those in said patent. It will be noted that a portion of the memory of FIG. 4*a* of the patent is not used. This portion is the part that uses the lines labelled 675 and 679 at the top of FIG. 4*a*.

Referring to FIG. 4*a* of U.S. Pat. No. 3,317,898, the line extending from the AND circuit 689 at the bottom left corner of FIG. 4*a* is the line which extends to the "1" side of flip-flop 154 of this embodiment.

The Read-Write Storage Element for the Branch Associative Memory is the same as shown in FIG. 5 of said patent. The Mask Register Storage Element which is disclosed in detail on FIG. 6 of U.S. Pat. No. 4,317,898 is used in the Argument Mask Register of the present embodiment. The Argument Register Storage Element shown in FIG. 7 of said patent is used in the Argument Register of this embodiment.

The system clock

The clocks utilized in the present embodiment might be a series of single shots having turn on and turn off outputs. The turn on pulses would be used to effect the operations specified in the Timing Sequence Charts and indicated as pulse inputs in FIG. 2. If one clock cycle follows another without any possible branching, the turn off pulse of the prior clock stage will turn on the next clock stage. Where tests must be made for a branch in the clock sequence, the outputs shown in FIG. 2 control the turn off of the next clock stage. Thus referring to FIG. 2I clock pulse P–11 applied to gate 214 queries the status of the Register B "Mask" field Decoder and determines whether the next clock stage activated will be P–12 or P–20.

It will, however, be understood that the system timing could be effected in many other ways by a person skilled in the art. One alternative way would be by a Read Only Store and a series of microprograms.

TIMING SEQUENCE CHARTS

Advance branch clock

Started every time an instruction is loaded into Instruction Register

A–1 Test Op Code and Comparison Bit. If "Advance Branch" and Comparison Bit is "1"
→–2
If "Advance Branch" and Comparison Bit is a"0"
→A–4
If Advance Branch→END A–2 Test AND circuit between Condition Code and "Mask" bits of instruction.
If result is all zeros→END
If not →A–3

A–3 Set all "Mask" bits to "1"
→A–4

A–4 Test "Enter Branch" F.F.
If on "1" →A–5
If on "0" →A–6

A–5 Delay only
→A–4

A–6 Gate "From," "To," "Mask" and "Retain" fields of th instruction to the "Enter Branch" register →A–7

A–7 Set "Enter Branch" F.F. to "1"
→END

Instruction address generation clock

I–1 Test "Enter Branch" F.F.
If on "1" →I–2
If on "0" →I–5

I–2 Reset match indicators to "1."
Gate "Enter Branch" Register to "From," "To," Mask" and "Retain" fields of the Branch Memory Data Register.
Gate a "1" to "In Use" field of Branch Associative Memory Data Register.
Gate Cycle Counter to "Cycle" field of Branch Associative Memory Data Register.
Gate "zeros" to all fields of argument mask register.
Gate a "0" to "In Use" field of argument register
I–3

I–3 Reset "Enter Branch" F.F. to "0"
Associate (to find topmost empty space)
→I–4

I–4 Apply A pulse and "write" pulse to Branch Associative Memory Controls.
→I–1

I–5 Test "Next Cycle" F.F.
If on "1" →I–6
If on "0" →I–1

I–6 Test "Next Cycle" F.F.
Test "Request Addresses" F.F.
If both on "1"→I–7
If either or both on "0"→I–21

I–7 Reset "Request Addresses" F.F. to "0"
→I–8

I–8 Gate "Request Addresses" register to "From" field of argument register.
Gate "ones" to "From" field of argument mask.
Gate "zeroes" to rest of argument mask.
Set match indicators to "1"
Set E.O.L. F.F. to "0"
→I–9

I–9 Associate
→I–10

I–10 Test E.O.L. F.F.
If on "0"→I–11
If on "1"→I–17

I–11 Apply A pulse and "Read" pulse to Branch Associative Memory Controls
→I–12

I–12 Gate "To" and "Mask" fields of Branch Associative Memory Data Register to "Address Z" and "Mask" fields of "Next Addresses" Register
→I–13

I–13 Test "Retain" bit of Branch Associative Memory Data Register
If on "1"→I–14
If on "0"→I–20

I–14 Gate Cycle counter to "cycle" field of Branch Associative Memory Data Register.
→I–15

I–15 Apply A pulse and "write" pulse to Branch Associative Memory Controls
→I–16

I–16 Test "Mask" field of Branch Associative Memory Data Register
If all one's→I–19
If not all one's→I–18

I–17 Gate "zeros" to "mask" field of "Next Addresses" Register
→I–18

I–18 Gate "Request Address" register through Incrementor to "Address 1" field of "Next Addresses" register
→I–19

I–19 Set "Addresses Ready" F.F. to "1"
→I–6

I–20 Gate a "0" to "In Use" field of Branch Associative Memory Data Register
→I–15

I–21 Test "Next Cycle" F.F.
If on "1"→I–6
If on "0"→I–22

I–22 Increment cycle counter
→I–23

I–23 Gate "one's" to "Cycle" field of argument mask.
Set rest of argument mask to "zeros."
Gate Cycle Counter to "Cycle" field of Argument Register
Gate a "1" to "In Use" field of Argument Register
Gate a "0" to "In Use" field of Branch Associative Memory Data Register
Reset match indicators to "1"
Set E.O.L. F.F. to "0"
→I–24

I–24 Associate
→I–25

I–25 Apply A pulse to Branch Memory Controls
→I–26

I–26 Test E.O.L. F.F.
If on "1"→I–1
If on "0"→I–27

I–27 Apply A pulse and "write" pulse to Branch Associative Memory Controls
→I–28

I–28 Apply B pulse to Branch Associative Memory Controls
→I–29

I–29 Apply C pulse to Branch Associative Memory Controls
→I–25

Processor Requests Next Instruction Clock

P–1 Reset "Start" F.F. to "0"
Gate "zeros" to all masks in Look-ahead Tree.
Set all "arrived" bits to "1" except Register SSS.
Set "top level" Counter to "3."
Gate address of first instruction to Register SSS.
Set "arrived" bit for Register SSS to "0."
Request Main Memory for first instruction which is at address just placed in Register SSS.
→P–2

P–2 Test "Top Level" Counter (Note "top level" Counter decrements to "1" and stays there.)
If on "1"→P–4
If not on "1"→P–3

P–3 Decrement "top level" Counter
→P–8

P–4 Test AND circuit between condition code and Mask field of Register B
If result is all zeros→P–5
If result is not all zeros→P–28

P–5 Test "arrived" bit of Register S
if on "0"→P–6
if on "1"→P–7

P–6 Delay only
→P–5

P–7 Gate Instruction in Register S to processor Instruction Register
Set "Request" F.F. to "0"
→P–8

P–8 Gate SS to S, SB to B
→**P–8*a***

P–8*a* SSS to SS, SSB to SB
SBS to BS, SBB to BB
→P–9

P–9 Set "next cycle" F.F. to "1"
set Counter J to "0"
set level 3 "arrived" bits to "1"
→P–10

P–10 Test Counter J
if on "0"→P–11, if on "1"→P–21
if on "2"→P–23, if on "3"→P–25
if on "4"→P–27

P–11 Test Register B "mask" field
Test Register SB "mask" field
If both are not all "one's"→P–12
Otherwise→P–20

P–12 Gate "address" field of Register SS to "Request Addresses" register
→P–13

P–13 Set "Request Addresses" F.F. to 1
→P–14

P–14 Test "Addresses Ready" F.F.
If not on "1"→P–15
If on "1"→P–16

P–15 Delay only
→P–14

P–16 Gate "Address 1" field of "Next Addresses" Register to address field of proper level 3 register under control of Counter J.
Gate "Address 2" and "Mask" fields of "Next Addresses" Register to "address" and "mask" fields of proper level 3 register under control of Counter J.
→P–17

P–17 Reset "Addresses Ready" F.F. to "0"
→P–18

P–18 Gate "address" field of level 3 register referred to in first paragraph of step P–16 to Instruction Fetch mechanism. If selected mask not all "one's."
Set same register "arrived" bit to "0"
→P–19

P–19 Gate "address" field of level 3 register referred to in second paragraph of step P–16 to Instruction Fetch mechanism. If selected mask not all "zeros."
Set same register "arrived" bit to "0"
→P–20

P–20 Increment Counter J
→P–10

P–21 Test Register B "Mask" field
Test Register SB "Mask" field.
If Register B "Mask" field is not all "ones" AND if Register SB "Mask" field is not all "zeros"
→P–22
Otherwise→P–20

P–22 Gate "address" field of Register SB to "Request Addresses" register
→P–13

P–23 Test Register B "Mask" field
Test Register BB "Mask" field
If Register B "Mask" field is not all "zeros" and Register BB "Mask" field is not all "one's"
→P–24
Otherwise→P–20

P–24 Gate "address" field of Register BS to "Request Addresses" Register
→P–13

P–25 Test Register B "Mask" field
Test Register BB "Mask" field
If Register B "Mask" field is not all "zeros" AND Register BB is not all "zeros"→P–26
Otherwise→P–20

P–26 Gate "address" field of Register BB to "Request Addresses" Register
→P–13

P–27 Reset "Next Cycle" F.F. to "0"
Test "top level" counter
If≠"1"→P–3
If="1"→P–32

P–28 Test "arrived" Bit of Register B
If on "0"→P–29
If on "1"→P–30

P–29 Delay only
→P–28

P–30 Set "Request" F.F. to "0"
Gate Instruction in Register B to processor Instruction Register
→P–31

P–31 Gate BS to S, BB to B
→P–31*a*

P–31*a* BSS to SS, BSB to SB
BBS to BS, BBB to BB
→P–9

P–32 Test "Start" and "Request" F.F.'s
If both on "0"→P–33
Otherwise→P–34

P–33 Delay only
→P–32

P–34 Test "Start" F.F.
If on "1"→P–1
If on "0"→P–2

Example of operation

Having described the general operational philosophy of the present system and described the details of the operation of the disclosed embodiment of FIG. 2 the following description of the example illustrated in FIG. 6 and FIGS. 8A–8J will serve to show exactly how an instruction list containing "Advance Branch" instructions is processed by the present system. The flow of individual instructions up through the Look-ahead Tree is shown in a step-by-step manner which is related to the tests which are made by the system at each step.

FIG. 6 shows a list of instruction addresses starting with the address N and extending to the address N+20. In the stream of instruction, the N+7 instruction is an "Advance Branch" instruction. The format of the "Advance Branch" instruction as stated previously is shown at the top of FIG. 2A in the Instruction Register. The left hand field is for the "operation code" which contains symbols which, when decoded, mean "Advance Branch." The "From" field is the address of the instruction after which the branch may take place. The "To" field is the address of the instruction to which the branch if taken will go. The "Mask" field specifies the condition under which the branch may take place. The "Retain" field enables the branch to be executed many times even though the branch instruction itself is only executed once. The "Immediate Comparison" field means that a test should be made between the mask field and the condition code immediately when the "Advance Branch" instruction is encountered. If the condition specified for the branch is successful, then the branch is treated as an unconditional branch. In other words, it can be determined in advance that the branch will be taken and it will be noted later in the description how this affects the operation of the Look-ahead Tree.

Referring again to FIG. 6, it will be noted as mentioned before, that the N+7 address is the addres of an "Advance Branch" instruction which specifies that the branch should be made from the address N+14 back to the address N+8. It is further specified that the "Retain" bit is set to "1" and that the "Immediate Comparison" bit is set to "0." The diagram shows how, if the branch is successful, the program will branch from the address N+14 back to the address N+8 and this loop may be executed many times. One advantage of the system of this embodiment is that the "Advance Branch" instruction can be taken out of a loop and still control the execution of this loop as many times as required.

FIG. 8A is a diagrammatic representation of the Look-ahead Tree. The "No-branch" Subtree is shown at the left of FIG. 8A and the "Branch" Subtree is shown at the right of FIG. 8A. In the top level of the two trees, or level 1, Register S (Sequential) contains the instruction which must be executed if the branch is unsuccessful. Register B (Branch) in level 1 contains the instruction which must be executed if the branch is successful. If the instruction in Register S is taken, then the "No-branch" Subtree is shifted up as shown by the arrows. If the instruction in Register B is taken, then the "Branch" Subtree is shifted up as indicated by the arrows. Only one or the other of the trees is shifted at any one time.

The ten charts which comprise FIGS. 8A–8J should now be considered along with FIGS. 6 and 7. When the system is first started up, the first address which is referred to as address N is placed in the SSS Register at the left of the level 3 of the "No-branch" Subtree. All of the "Mask" fields in the register ending in B are initially loaded with all zeros. The successive sequential addresses N through N+12 are shifted upward in the left portion of the "No-branch" Subtree until the conditions shown in FIG. 8B exist. It will be noted now that the address N+14 will be followed by the address N+15 if the branch is not successful and that the address N+14 will be followed by the address N+8 if the branch is successful. The fact that the address N+14 is in the level 2 Register SS will cause the machine to place the N+15 address in the third level Register SSS and place the N+8 address in the Register SSB. It will be noted from FIG. 7 that the loading of the SSS and the SSB Registers is controlled by the "Mask" field in Register B and the "Mask" field in Register SB.

Figure 8B:
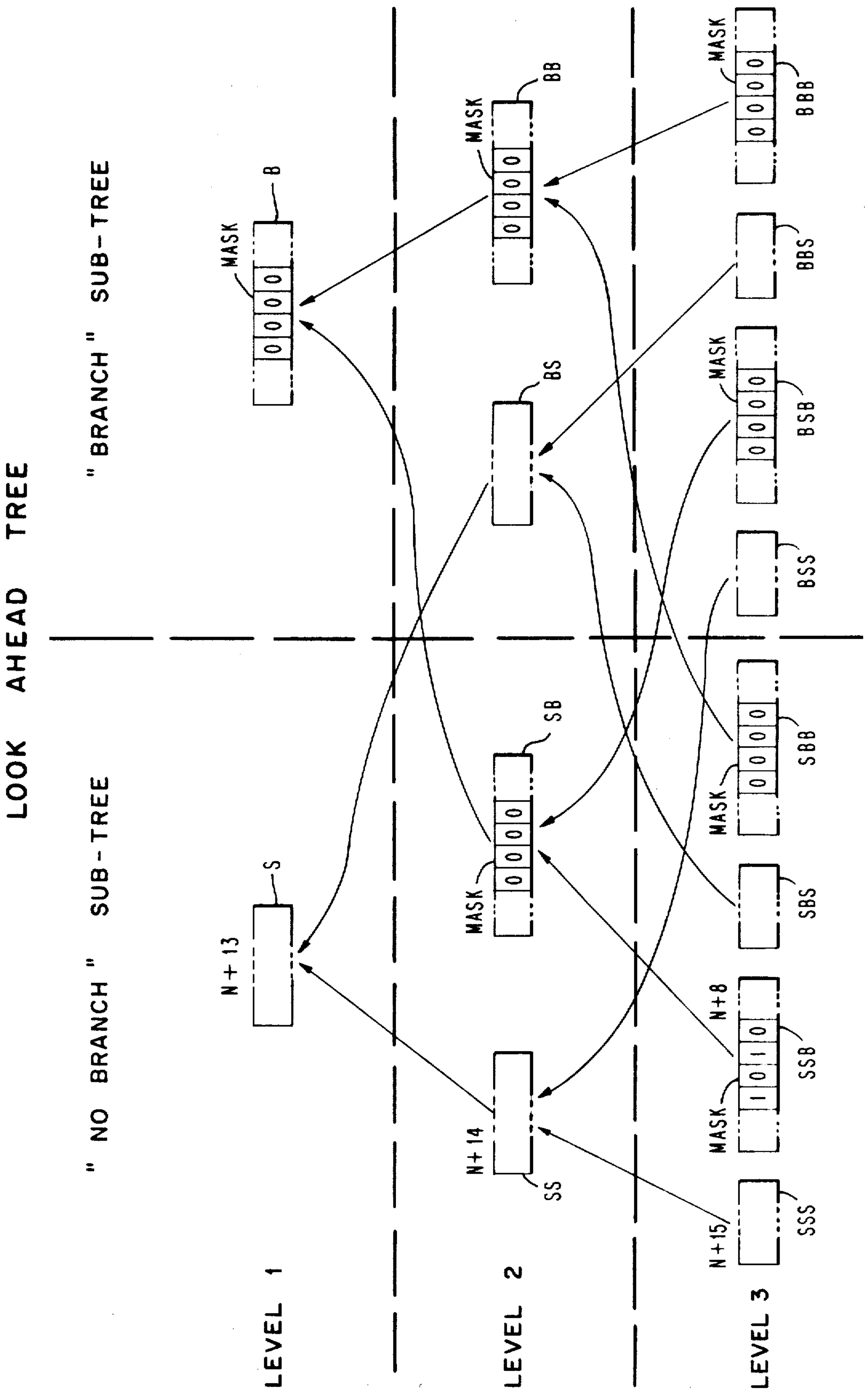
FIGS. 8B–8J are identical in functional content to that of FIG. 8A; however, they show the progress of the list of instructions illustrated in FIG. 6 through the present look-ahead system.
Figure 8C:
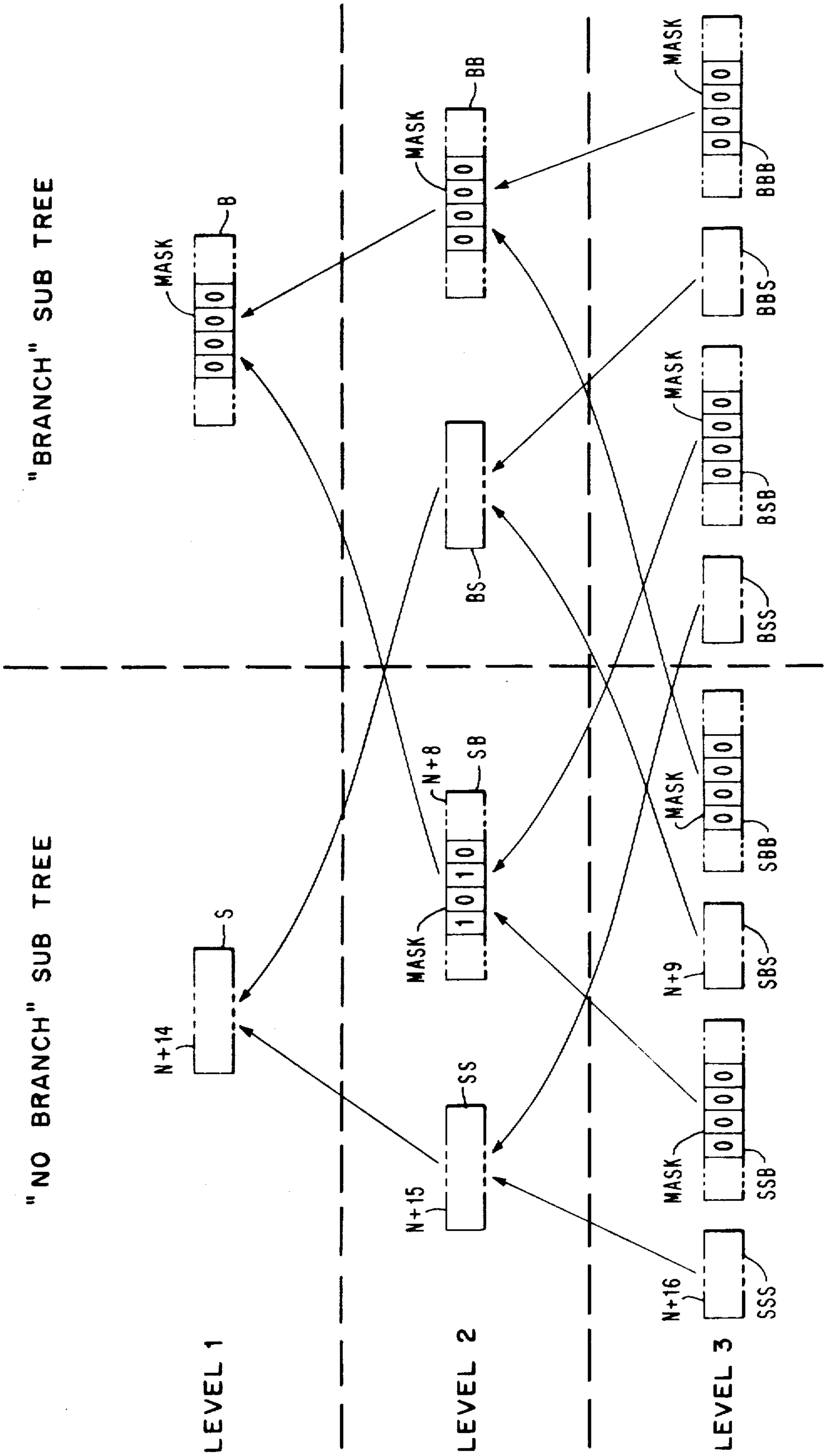

As shown by the table in FIG. 7, these two registers can be loaded only if the "Mask" fields in the B and SB Registers are not all "1's" (i.e. not an unconditional branch). During each of the loading operations from FIG. 8A–8B the sequential addresses were loaded in Register SSS and the "Mask" field in Register SSB was set to all zeros each time it was loaded until we get to FIG 8B. In FIG. 8B it will be noted that the N+15 address was loaded in Register SSS and that the address N+8 was loaded in the Register SSB. It will also be noted that the "Mask" field in Register SSB is now some mixture of 1's and zeros. In other words, it is not all 1's and it is not all zeros. It will also be noted that the N+14 address is what was contained in the "From" field of the "Advance Branch" instruction and that the N+8 address comprises the contents of the "To" field of the "Advance Branch" instruction. These two instructions were stored in the Branch Memory (BAM) until they were needed. They are needed on FIG. 8B. FIG. 8C shows how the N+14 address is shifted upward to the Register S and how the instruction N+15 is shifted upward to Register SS. The address N+8 is shifted upward from the Register SSB to the Register SB. It is next necessary to load the pair of Registers SSS and SSB and the pair labelled SBS and SBB according to the rules shown in FIG. 7. Following these rules, it will be noted that the N+16 address is loaded into Register SSS. Nothing is loaded in Register SSB and that is why its mask is set to all zeros. The address N+9 is loaded into the Register SBS because this is the address that would follow N+8 if the branch is taken. Nothing is loaded into Register SBB and that is why its mask is all zeros.

Figure 8D:
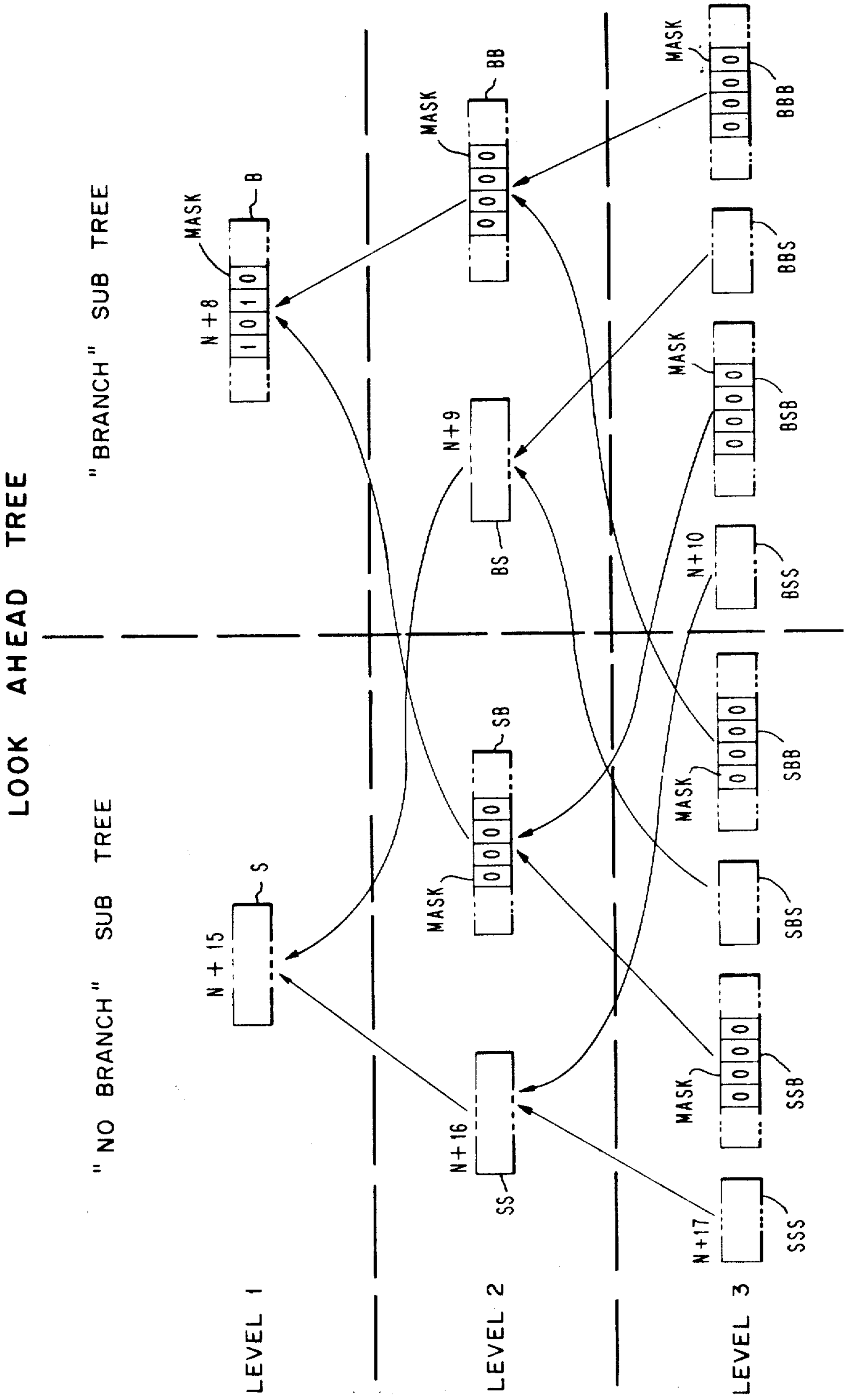

Referring next to FIG. 8D, it is shown how the address $N+15$ is shifted from the Register SS to the Register S. The address $N+16$ is shifted from the Register SSS to the Register SS. The address $N+8$ is shifted from the Register SB to the register B. The address $N+9$ is shifted from the Register SBS to the Register BS. The $N+17$ address is loaded into Register SSS. The "Mask" field of SSB is loaded with "zeros." The $N+10$ address is loaded into Register BSS. The "Mask" field of BSB is loaded with zeros.

For the purposes of this example, it will first be assumed that the address $N+8$ is accepted next or, in other words, that the branch is successful. As shown in FIG. 6, if the branch is successful, the instruction stream goes from $N+14$ to $N+8$ and if the branch is not successful, the sequence would be from $N+14$ to $N+15$. It will be noted on FIG. 8D that both addresses $N+15$ and $N+8$ are available at the top of the two subtrees.

Figure 8E:
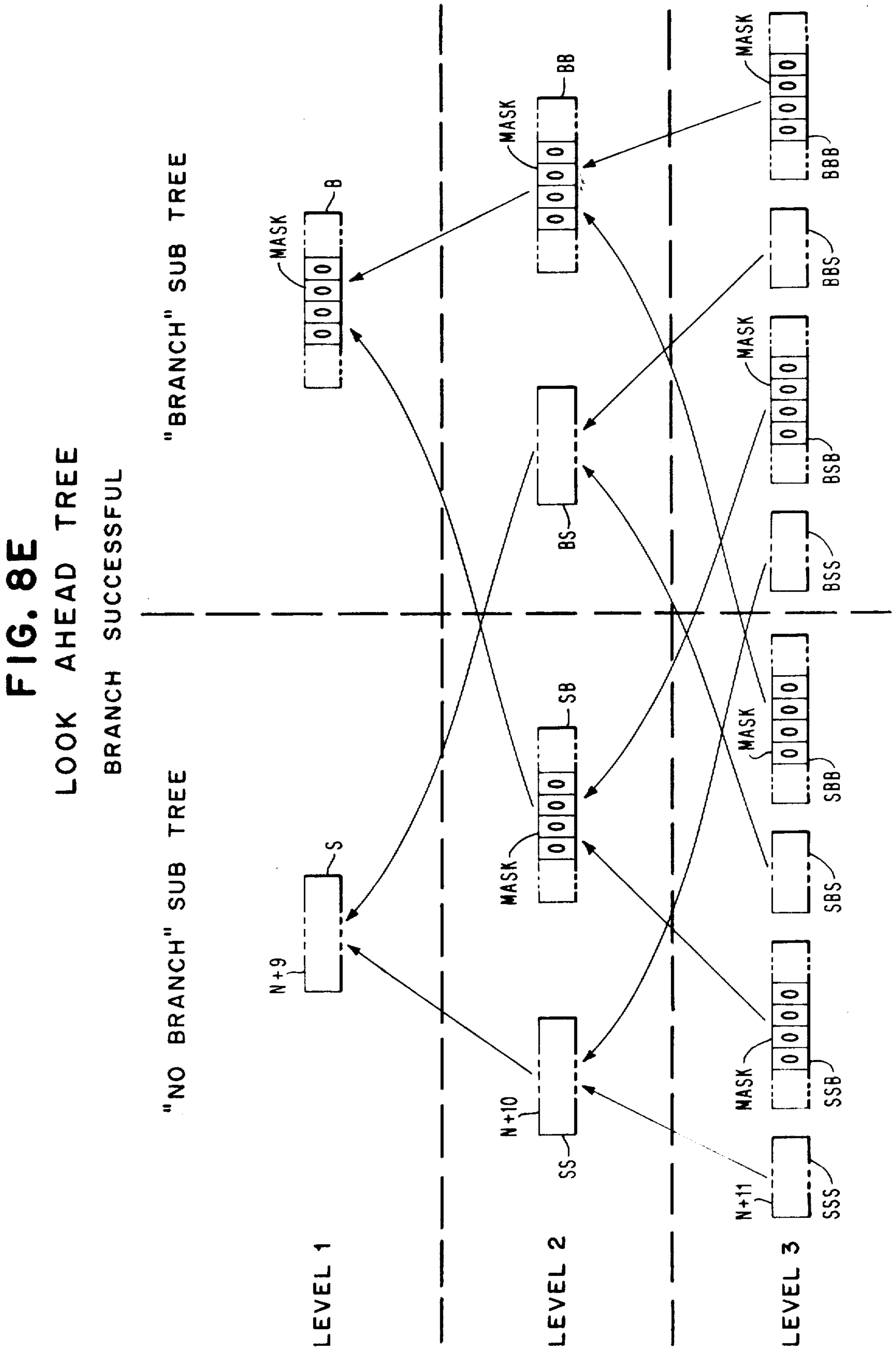

Assuming that the branch is taken, the right hand or "Branch" Subtree will be shifted upwardly as shown in FIG. 8E. The $N+9$ address which was in Register BS, is shifted upward to the Register S. The $N+10$ address which was in Register BSS is shifted upward to Register SS. As also shown in FIG. 8E, when the level 3 registers are loaded according to the rules established by FIG. 7 the $N+11$ address will be loaded into Register SSS. Nothing will be loaded into Register SSB which explains why its Mask is set to all zeros.

Figure 8F:
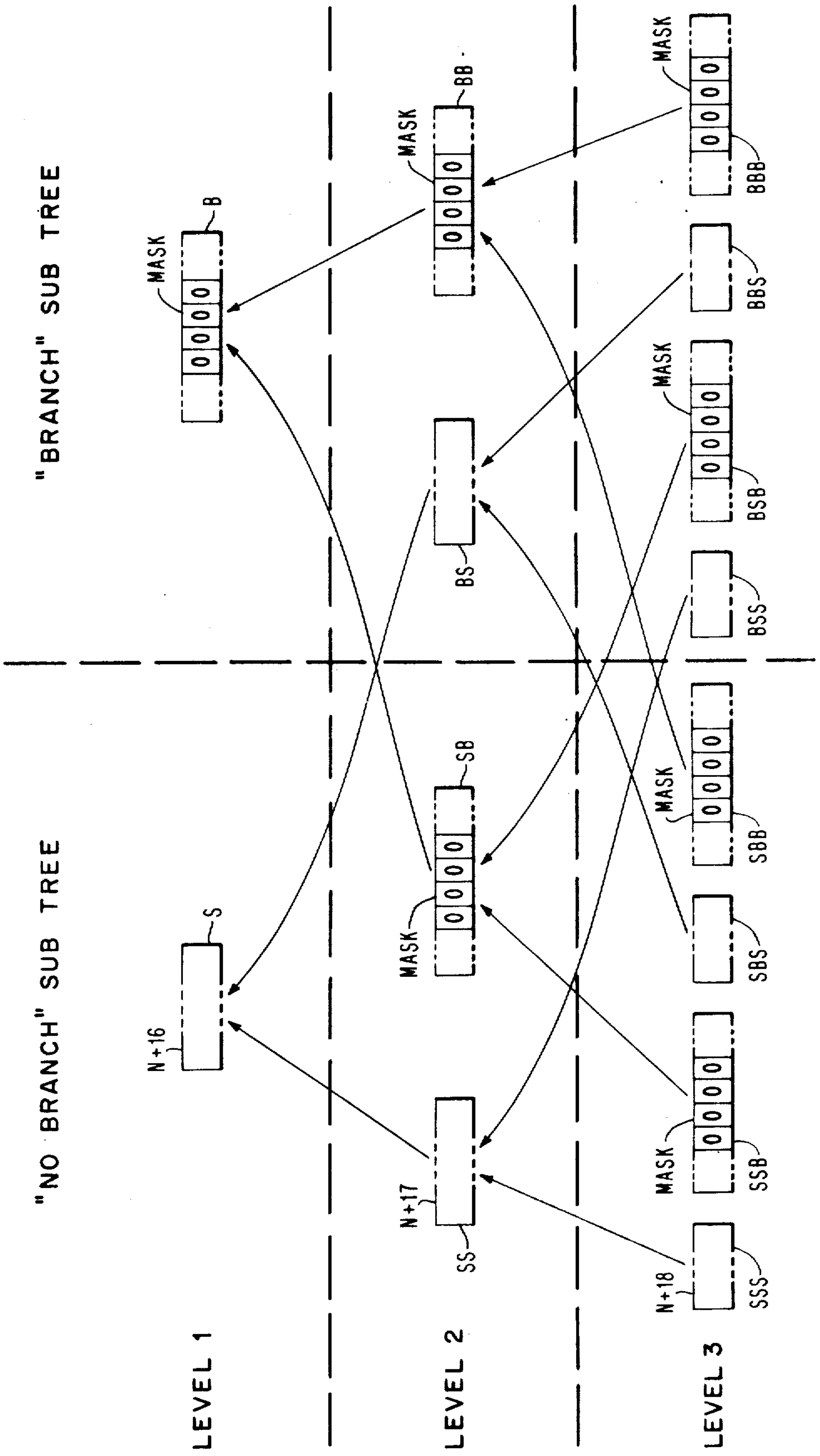

Assuming now that the branch were unsuccessful then the left hand subtree would shift upwardly as shown in FIG. 8F. The $N+16$ address would shift upwardly into Register S and the address $N+17$ would shift upwardly into Register SS instead of the address $N+10$ which would have been shifted from Register BSS to Register SS if the branch had been successful.

Referring to FIG. 6, it will be noted that if the branch from $N+14$ were unsuccessful, then the next instruction executed would be at the address $N+15$ which is another "Advance Branch" instruction which specifies a branch from $N+18$ back to $N+4$. The retain bit is set to "0" which means that it is only desired to use this branch information once for each time the branch instruction itself is executed. The "Immediate Comparison" bit is set to "1" which means that the comparison between the mask of this "Advance Branch" instruction must be made immediately with the condition code. If the comparison between the Mask field of the "Advance Branch" instruction at the address $N+15$ is successful then the branch instruction is treated as an unconditional branch. If this comparison is not successful it means that the "Advance Branch" instruction is to be ignored. For this example, it will be assumed that the comparison between the mask field and the condition is successful and therefore the branch will occur from $N+18$ back to $N+4$ in a manner to be described. The Mask field of this "Advance Branch" instruction is set to all "ones" (branch on any condition).

Figure 8G:
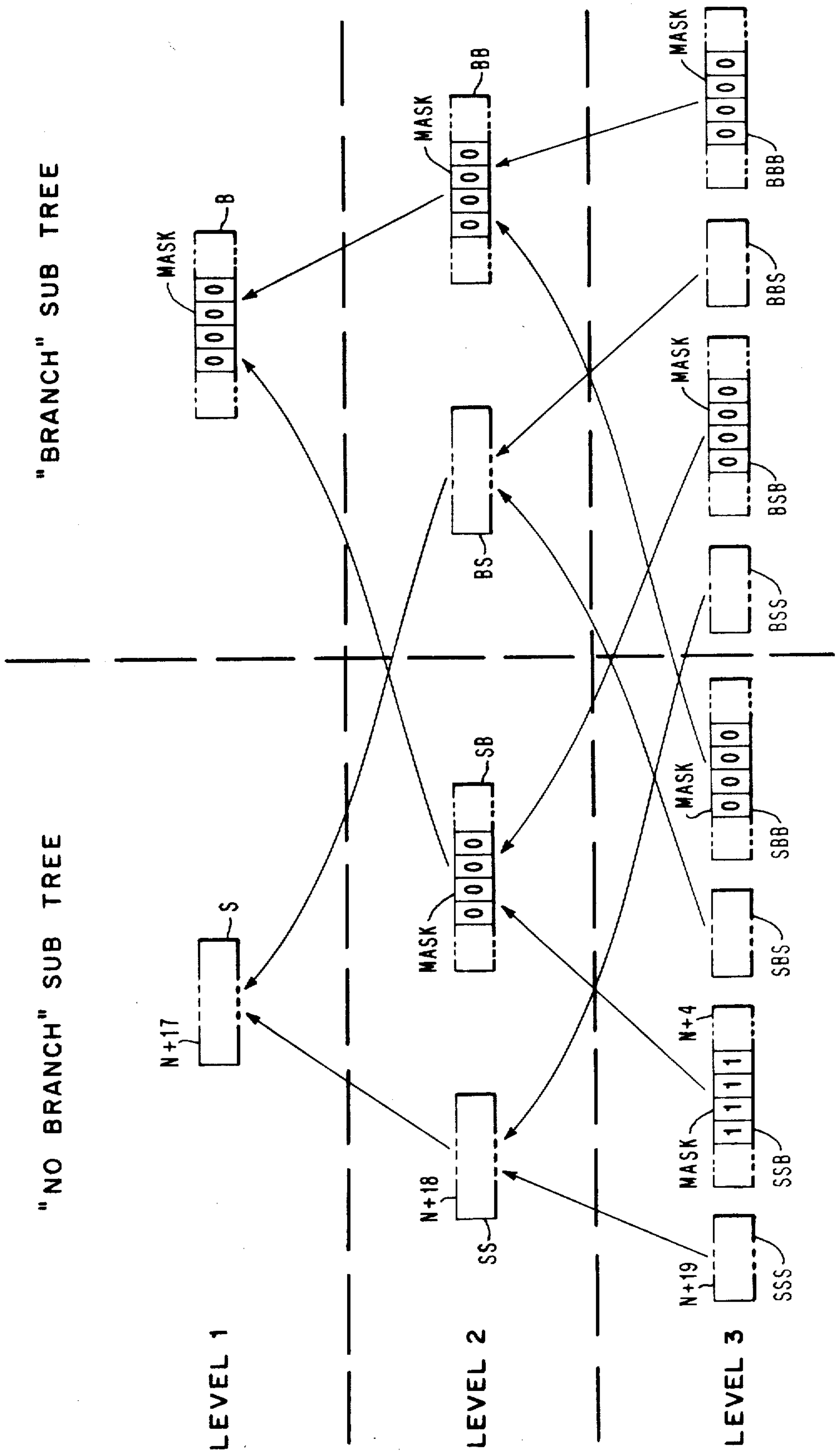

The left hand or "No-branch" Subtree will move upwardly in normal fashion until the condition shown in FIG. 8G is obtained. Here the address $N+18$ is in Register SS and thus will govern the loading of the Registers SSS and SSB. It will be noted that the $N+19$ address is loaded in Register SSS and the address $N+4$ is loaded into the Register SSB and that the Mask field of the Register SSB is now set to all 1's which, in effect, means an unconditional branch.

Figure 8H:
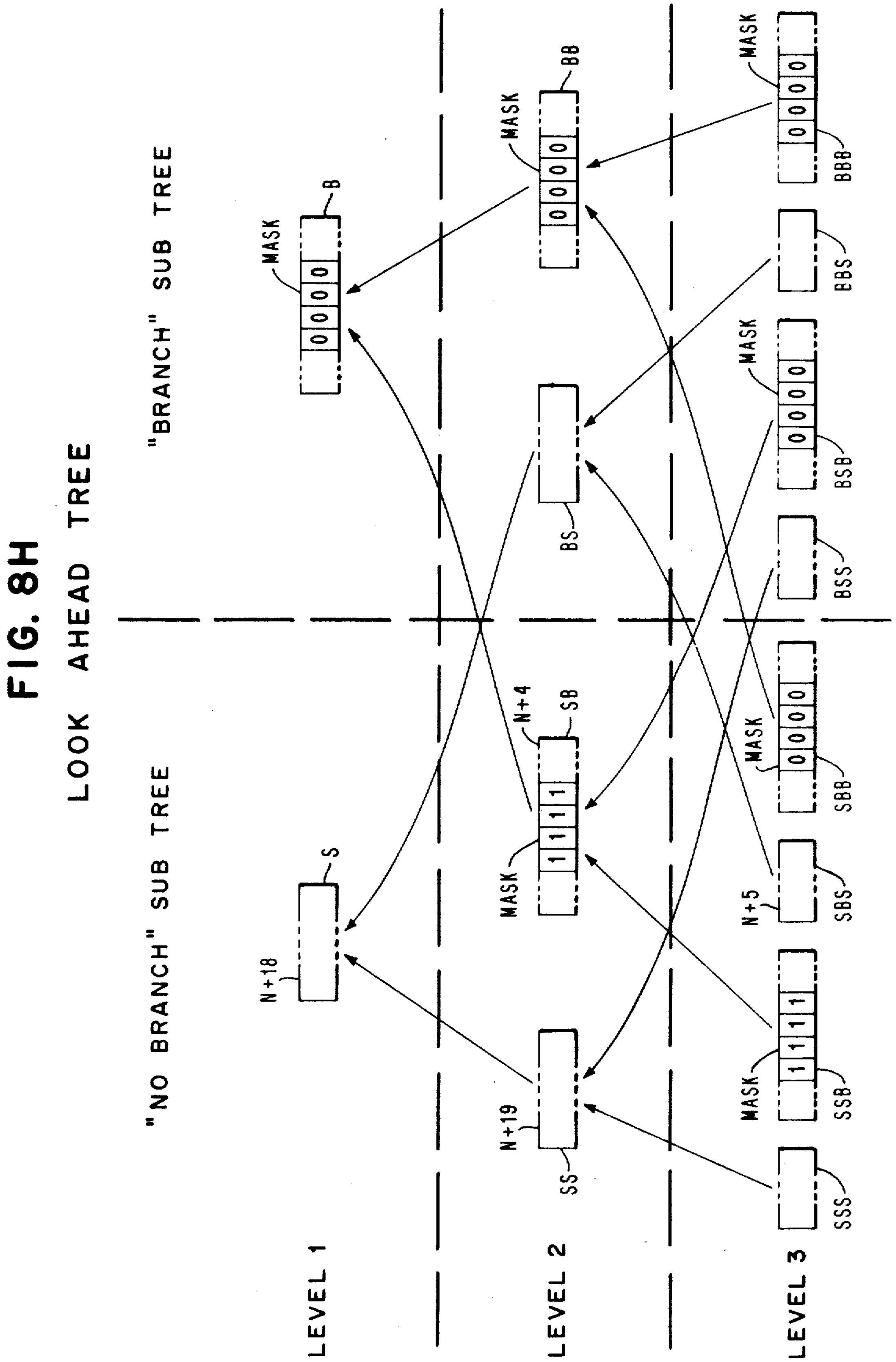

FIG. 8H shows how the instruction and address $N+18$ is shifted upwardly from Register SS to Register S. The address $N+4$ is shifted upwardly from Register SSB to Register SB. Nothing is in Register B. It will be noted now that according to the rules in FIG. 7, that Registers SSS and Registers SSB cannot be loaded. Only Register SBS and Register SBB can be loaded. The address $N+5$ is loaded into Register SBS and nothing is put in Register SBB. Its Mask is set to all zeros.

Figure 8I:
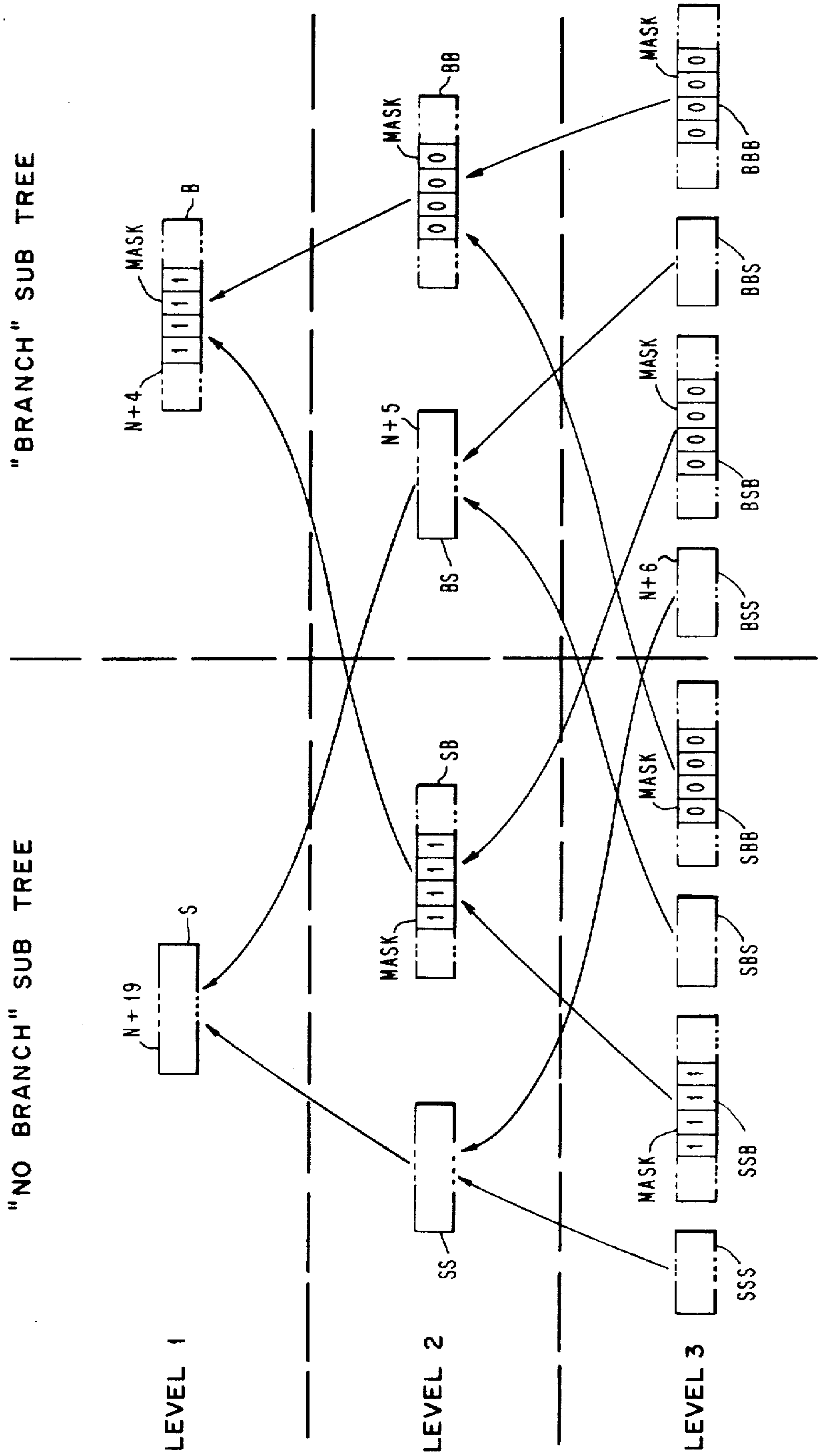

The "No-branch" Subtree shifts upwardly as shown by FIG. 8I. It will be noted that the address $N+19$ goes into Register S and that the address $N+4$ goes into Register B. The address $N+5$ is shifted from the Register SBS to the Register BS. Because the machine knows that this is an unconditional branch, it was not necessary to load the Registers SSS and SSB. In other words, it is known that the address $N+18$ will be followed by the address $N+4$ and that $N+4$ will be followed by $N+5$ and so on. The loading of the level 3 registers will thus be confined in FIG. 8I to the Registers BSS and BSB. The $N+6$ will go into Register BSS and nothing will be put in Register BSB. However, its Mask field is set to all zeros.

Figure 8J:
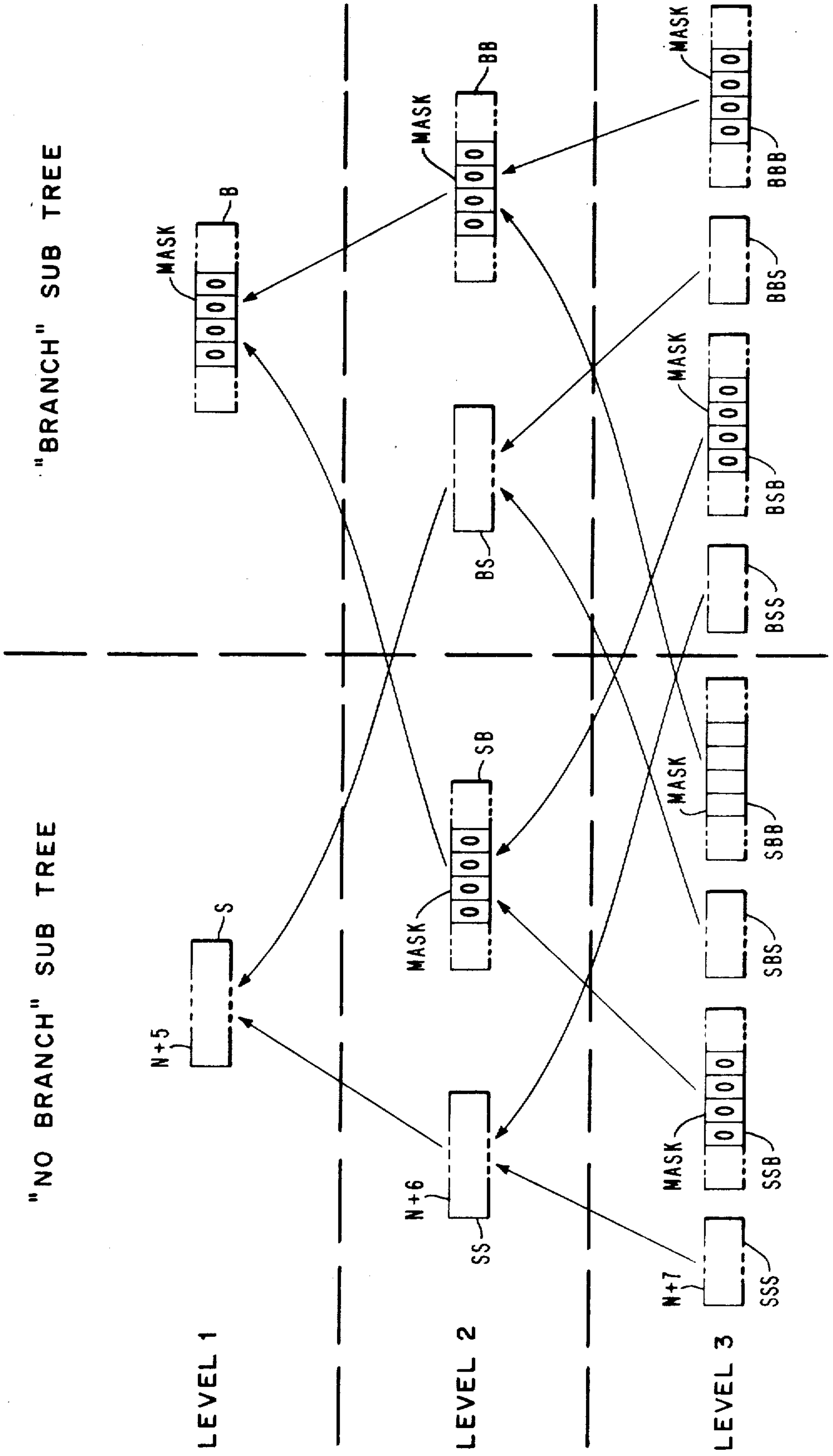

FIG. 8J shows the shift of the "Branch" Subtree after the $N+4$ address is taken. The $N+5$ address which was in Register BS is shifted to Register S. The $N+6$ address which was in Register BSS is shifted to Register SS. When the level 3 registers are loaded, the $N+7$ address is put in Register SSS and the mask field of Register SSB is set to all zeros.

While the invention has been particularly shown and described with reference to a preferred embodiment thereof, it will be understood by those skilled in the art that various changes in form and details may be made therein without departing from the spirit and scope of the invention.

What is claimed is:

1. An instruction look-ahead branch detection system for use with an electronic computing system including a central processor and a memory wherein a special advance branch instruction is inserted in the instruction list at a location prior to a branch point,
- means for recognizing the advance branch instruction,
- means for extracting a branching address therefrom indicating a branch point at a subsequent position in the instruction list,
- means for storing said branching address,
- means for comparing the address of each instruction requested from memory with said branching address, and
- means responsive to a successful comparison for indicating that the next instruction to be accessed could be the first instruction of a branch routine.

2. An instruction look-ahead branch detection system as set forth in claim 1 including means operable when said advance branch instruction precedes the instruction which is the subject of the "go to" address in the instruction list, to allow the processor to perform an instruction loop caused by the branch point, in the instruction list a plurality of times while only evaluating the advance branch instruction a single time.

3. An instruction look-ahead branch detection system as set forth in claim 2 wherein said advance branch instruction includes a mask field for specifying the conditions under which a branch is to be taken,
- means for extracting said mask from said advance branch instruction,
- means for storing said mask in said storing means together with said branch address and said "go to" address and
- means for comparing said mask with a condition code obtained from the processor to determine if the branch conditions have been met.

4. An instruction look-ahead branch detection system as set forth in claim 3 wherein said means for storing the mask and said branching and "go to" addresses of the advance branch instruction comprises an associative memory including means for making associative comparisons on selected data fields of all words stored therein.

5. An instruction look-ahead branch detection system as set forth in claim 4 including a look-ahead storage tree for storing sequential levels of instructions fetched from memory prior to utilization by said processor and including
- means for storing the addresses and instructions associated therewith in said look-ahead storage tree for both sequential instructions and "go to" instructions following a branch point in the instruction list.

6. An instruction look-ahead branch detection system as set forth in claim 5 wherein the means for storing the instructions from memory into the look-ahead tree includes
- means for comparing the address of an instruction being fetched from memory with the addresses currently stored in the associative memory whereby subsequent instruction addresses may be generated and stored in the look-ahead tree and these addresses subsequently moved between levels in said look-ahead tree before the instruction itself arrives from memory, and
- means for storing the mask included in an advance branch instruction, in the look-ahead tree accompanying its related "go to" address.

7. An instruction look-ahead branch detection system as set forth in claim 6 wherein said look-ahead tree includes first and second subtrees wherein each of said subtrees contain a plurality of levels of instruction storage locations, the first level of each subtree containing a single storage location and wherein each level thereunder contains twice as many storage locations as the level immediately preceding it, and
- means for transferring an instruction to the processor, on request, only from the top level of either of said subtrees, wherein the top level of the first subtree will only contain a sequential instruction and wherein the top level of the second subtree will only contain the first instruction of a branch.

8. An instruction look-ahead branch detection system as set forth in claim 7 wherein said advance branch instruction further includes a bit which indicates that said mask is to be immediately evaluated to determine if the branch condition is satisfied,
- means for testing said last named bit,
- means responsive to an affirmative determination by said last named testing means to cause said branch to be unconditionally taken when the branch point is reached in the instruction list.

9. An instruction look-ahead branch detection system as set forth in claim 8 including
- means for testing a field of each advance branch instruction to determine if the branch is to be taken only once, and
- means responsive to an affirmative determination to cause a particular memory word stored in said associative memory related to a particular advance branch instruction to be effectively deleted from said memory subsequent to a single execution of the branch.

10. An instruction look-ahead branch detection system as set forth in claim 9 including
- means for effectively deleting a branch point indication if the branch is not taken within a predetermined amount of time.

11. An instruction look-ahead branch detection system as set forth in claim 10 wherein said last named means comprises a counter having a maximum count number dependent upon the maximum number of instruction cycles for which it is desired to retain a branch indication in said system,
- means for inserting the contents of said counter in a count field of each word stored in the associative memory related to a particular advance branch instruction,
- means for testing the count fields of each word stored in said associative memory each time said counter advances and for deleting any word whose count field matches the current setting of said counter.

12. An instruction look-ahead branch detection system for use with an electronic computing system including a central processor and a central memory and including a special advance branch instruction which is to be used in the instruction list at a location sufficiently prior to an actual branch point that the advance branch instruction will be completely evaluated by the processor prior to reaching said branch point, said advance branch instruction including a "from" address which refers to the address of the instruction at which a branch may occur, a "mask" field which specifies the conditions under which the branch will occur, and a "go to" address which is the address in the instruction list of that instruction to which the branch, if the specified conditions are met, will go,
- means for recognizing an advance branch instruction,
- means for extracting that data comprising the "from" address, the "go to" address, and the "mask" field from said advance branch instruction,
- storage means for said data extracted from said advance branch instruction,
- means for generating the addresses of sequential instructions in said instruction list,
- means for comparing each address so generated with the "from" address stored in said storage means, means operative upon a successful comparison of said addresses for extracting the "go to" address and the "mask" field which accompanied the successfully compared "from" address, means for requesting the instruction specified by said "go to" address from memory in addition to an aforementioned generated sequential instruction address, a look-ahead storage tree including means for storing said sequential and "go to" instruction addresses and their associated instruction, means for storing the "mask" field extracted from said storage means together with the "go to" address associated therewith in said look-ahead storage tree, and means for transferring instructions from a top level of said look-ahead storage tree to the processor upon request.

13. An instruction look-ahead branch detection system as set forth in claim 12 wherein said look-ahead storage tree comprises:

a sequential and a branch subtree wherein any instruction transferred to said processor which is sequential to the instruction currently being evaluated by said processor is transferred from the sequential subtree and wherein an instruction which is the subject of a "go to" address of some previous branch instruction is transferred from the branch subtree.

14. An instruction look-ahead branch detection system as set forth in claim 13 wherein each of said subtrees comprises a plurality of storage levels, the upper level of each subtree containing only one storage location, and wherein each sublevel contains twice as many storage locations as the one immediately preceding same, and wherein each storage location includes fields for storing the instruction address, the actual instruction, and the "mask" field for those addresses corresponding to the "go to" addresses specified in the advance branch instruction and subsequently stored in the storage means.

15. An instruction look-ahead branch detection system as set forth in claim 14 wherein each storage location in a given level of said subtrees has two storage locations directly related thereto in the level immediately below same, one of said two storage locations being utilized to store the next sequential address, and the other storage location being utilized to store a "go to" address if it is determined that the instruction address in the adjacent upper level is a branch point.

16. An instruction look-ahead branch detection system as set forth in claim 15 including control means associated with the upper levels of said subtrees operative upon the existence of an address in both of said subtrees for examining and evaluating the "mask" accompanying the "go to" address and instruction in the upper level of the branch subtree to determine if said mask condition specified is fulfilled, means operative upon an affirmative determination for transferring the instruction from the branch subtree to the processor upon the next instruction request from said processor, and means operable upon a negative determination of said condition to transfer the instruction in the top level of said sequential subtree to the processor upon request from said processor.

17. An instruction look-ahead branch detection system as set forth in claim 16 wherein said storage means comprises an associative memory including means for conducting a search therein on only the "from" address fields of data stored therein.

18. An instruction look-ahead branch detection system as set forth in claim 17 including means for effectively removing data stored in said associative memory relating to a particular advance branch instruction in accordince with a use criteria if a word is not accessed within a desired number of instruction execution cycles.

19. An instruction look-ahead branch detection system as set forth in claim 18 wherein said system includes means for effectively resetting said use criteria for a branch stored therein each time the branch is taken as a result of a successful compare with its "from" address whereby the branch data may be retained and accessed any desired number of times.

References Cited

UNITED STATES PATENTS

| | | | |
|---|---|---|---|
| 3,266,020 | 8/1966 | Cheney et al. | 340—172.5 |
| 3,401,376 | 9/1968 | Barnes et al. | 340—172.5 |

GARETH D. SHAW, Primary Examiner

H. E. SPRINGBORN, Assistant Examiner